(12) United States Patent
Ruan et al.

(10) Patent No.: US 12,158,594 B2
(45) Date of Patent: Dec. 3, 2024

(54) OPTICAL IMAGING SYSTEM HAVING ABERRATION COMPENSATION LENS GROUP

(71) Applicant: HUAWEI TECHNOLOGIES CO., LTD., Shenzhen (CN)

(72) Inventors: Wangchao Ruan, Shenzhen (CN); Jie Dai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1068 days.

(21) Appl. No.: 17/073,389

(22) Filed: Oct. 18, 2020

(65) Prior Publication Data

US 2021/0033878 A1 Feb. 4, 2021

Related U.S. Application Data

(63) Continuation of application No. PCT/CN2019/076983, filed on Mar. 5, 2019.

(30) Foreign Application Priority Data

Aug. 31, 2018 (CN) .......................... 201811012149.6

(51) Int. Cl.
*G02B 13/18* (2006.01)
*G02B 27/00* (2006.01)
(Continued)

(52) U.S. Cl.
CPC ........... *G02B 27/286* (2013.01); *G02B 13/18* (2013.01); *G02B 27/0025* (2013.01);
(Continued)

(58) Field of Classification Search
CPC .. G02B 13/002; G02B 13/0065; G02B 13/18; G02B 27/0025; G02B 27/0062;
(Continued)

(56) References Cited

U.S. PATENT DOCUMENTS

2006/0092528 A1* 5/2006 Arai ....................... G02B 13/18
359/771
2014/0211322 A1 7/2014 Bohn et al.
(Continued)

FOREIGN PATENT DOCUMENTS

CN 1930511 A 3/2007
CN 101915980 A 12/2010
(Continued)

OTHER PUBLICATIONS

European Search Report issued in corresponding European Application No. 19855088.1, dated Oct. 26, 2021, pp. 1-12, European Patent Office, Munich, Germany.
(Continued)

*Primary Examiner* — Ryan S Dunning
(74) *Attorney, Agent, or Firm* — HAUPTMAN HAM, LLP

(57) ABSTRACT

Embodiments provide an optical imaging system, which includes a first aberration compensation lens group, a polarizer, an optical imaging module, and a display, where the display, the first aberration compensation lens group, the polarizer, and the optical imaging module are sequentially arranged. The display is configured to emit non-polarized light. The first aberration compensation lens group is configured to perform aberration compensation on the non-polarized light emitted by the display. The polarizer is configured to transmit polarized light in non-polarized light that is obtained after the aberration compensation and that is emitted by the first aberration compensation lens group. The optical imaging module is configured to: fold an optical path, and emit the polarized light. The embodiments of this application are applied to an optical imaging process.

19 Claims, 17 Drawing Sheets

(51) Int. Cl.
  *G02B 27/01* (2006.01)
  *G02B 27/28* (2006.01)
  *G06F 3/14* (2006.01)
(52) U.S. Cl.
  CPC ........... *G02B 27/0172* (2013.01); *G06F 3/14* (2013.01); *G02B 2027/011* (2013.01)
(58) Field of Classification Search
  CPC ............ G02B 27/0172; G02B 27/286; G02B 2027/011; G02B 2027/0116; G02B 2027/0123; G02B 2027/015; G02B 2027/0152; G02B 2027/0172; G06F 3/14
  See application file for complete search history.

(56) References Cited

U.S. PATENT DOCUMENTS

| | | | | |
|---|---|---|---|---|
| 2016/0041390 | A1* | 2/2016 | Poon | G02B 5/3083 |
| | | | | 359/489.08 |
| 2017/0227770 | A1* | 8/2017 | Carollo | G02B 27/0172 |
| 2017/0248769 | A1 | 8/2017 | Stamenov | |
| 2018/0039052 | A1 | 2/2018 | Khan et al. | |
| 2018/0101020 | A1 | 4/2018 | Gollier et al. | |
| 2018/0120579 | A1 | 5/2018 | Gollier et al. | |
| 2021/0223500 | A1* | 7/2021 | Hirao | G02B 13/0025 |

FOREIGN PATENT DOCUMENTS

| | | |
|---|---|---|
| CN | 102906625 A | 1/2013 |
| CN | 105093555 A | 11/2015 |
| CN | 204855955 U | 12/2015 |
| CN | 105629472 A | 6/2016 |
| CN | 205899148 U | 1/2017 |
| CN | 106707510 A | 5/2017 |
| CN | 108051920 A | 5/2018 |
| CN | 108241212 A | 7/2018 |
| CN | 108292041 A | 7/2018 |
| CN | 108303796 A | 7/2018 |
| CN | 108333724 A | 7/2018 |
| CN | 108351526 A | 7/2018 |
| CN | 110146978 A | 8/2019 |
| KR | 20130116548 A | 10/2013 |
| WO | 2016022732 A1 | 2/2016 |
| WO | 2017128183 A1 | 8/2017 |
| WO | 2018010245 A1 | 1/2018 |

OTHER PUBLICATIONS

Partial Supplementary European Search Report issued in corresponding European Application No. 19855088.1, dated Jun. 2, 2021, pp. 1-10.

* cited by examiner (a)

(b)

Actual lens (a)

(b)

OPTICAL IMAGING SYSTEM HAVING ABERRATION COMPENSATION LENS GROUP

CROSS-REFERENCE TO RELATED APPLICATIONS

This application is a continuation of International Application No. PCT/CN2019/076983, filed on Mar. 5, 2019, which claims priority to Chinese Patent Application No. 201811012149.6, filed on Aug. 31, 2018. The disclosures of the aforementioned applications are hereby incorporated by reference in their entireties.

TECHNICAL FIELD

Various embodiments relate to the optics field, and in particular, to an optical imaging system.

BACKGROUND

Virtual reality (VR) means that digitized content is projected to human eyes by using an optical imaging system, to implement immersive virtual experience as if a user is in a virtual world. A most key component of a VR device is an optical imaging system. Core components of the optical imaging system include an imaging lens (or a lens group) and a display. FIG. 1 is a schematic diagram of a principle of an optical imaging system according to the prior art. Light emitted by the display is incident to pupils of human eyes after being refracted by the imaging lens, reverse extension lines of light rays entering the pupils of the human eyes focus in the distance to form a virtual image, and an image viewed by the human eyes is the virtual image. The virtual image is an enlarged image of an image displayed by the display. An angle of the virtual image to the human eyes is a field of view (FoV).

Imaging definition of the VR device is a key indicator of evaluating VR experience, and a size and a weight of the VR device are key indicators of evaluating appearance and wearing comfortableness of the VR device. A distance from the imaging lens to the display is a thickness of the optical imaging system, and determines the size of the VR device. The weight of the VR device depends on the size of the VR device and a material of the VR device.

In the prior art, an entire optical path may be included between a reflective polarizer (RP) and a polarizer (stuck to the display) by using an optical path polarization and folding principle, to reduce the size of the VR device. In this case, in the optical imaging system, all lenses whose curvatures are not zero use phase-independent materials (or materials having no birefringent effect), namely, cold-worked glass materials. Although the size of the VR device is reduced, because density of glass is two to six times higher than that of plastic, the weight of the VR device is not reduced. In addition, because the cold-worked glass material is usually used to make a spherical lens, and an aberration correction capability of the spherical lens is far lower than that of an aspherical lens, in a case of a same quantity of lenses, imaging definition of a spherical mirror is far lower than imaging definition of an aspherical mirror. To improve imaging definition, a quantity of glass lenses needs to be increased. As a result, the size and the weight of the VR device are greatly increased. To reduce the size and the weight of the VR device, a lens may use an optical resin material. However, because the optical resin material has a birefringent effect, imaging definition is inevitably reduced.

Therefore, how to reduce a size and a weight of an optical imaging system and obtain relatively high imaging definition under a relatively large FoV is a problem urgently to be resolved.

SUMMARY

Various embodiments provide an optical imaging system, to resolve a problem of how to reduce a size and a weight of an optical imaging system and obtain relatively high imaging definition under a relatively large FoV.

To achieve the foregoing objective, the following technical solutions are achieved by various embodiments.

According to a first aspect, one embodiment provides an optical imaging system. The optical imaging system includes: a first aberration compensation lens group, a polarizer, an optical imaging module, and a display, where the display, the first aberration compensation lens group, the polarizer, and the optical imaging module are sequentially arranged. It may be understood that the first aberration compensation lens group is located between the display and the polarizer, and the optical imaging module is located after the polarizer in the display, the first aberration compensation lens group, and the polarizer that are sequentially arranged. The display is configured to emit non-polarized light; the first aberration compensation lens group is configured to perform aberration compensation on the non-polarized light emitted by the display; the polarizer is configured to transmit polarized light in non-polarized light that is obtained after the aberration compensation and that is emitted by the first aberration compensation lens group; and the optical imaging module is configured to: fold an optical path, and emit the polarized light. Alternatively, the optical imaging system includes a second aberration compensation lens group, a polarizer, an optical imaging module, and a display, where the display, the polarizer, the optical imaging module, and the second aberration compensation lens group are sequentially arranged. It may be understood that the polarizer is located between the optical imaging module and the display, and the second aberration compensation lens group is located after the optical imaging module in the display, the polarizer, and the optical imaging module that are sequentially arranged. The display is configured to emit non-polarized light; the polarizer is configured to transmit polarized light in the non-polarized light emitted by the display; the optical imaging module is configured to: fold an optical path, and emit the polarized light; and the second aberration compensation lens group is configured to perform aberration compensation on the polarized light emitted by the optical imaging module. Alternatively, the optical imaging system includes a third aberration compensation lens group, a fourth aberration compensation lens group, a polarizer, an optical imaging module, and a display, where the display, the third aberration compensation lens group, the polarizer, the optical imaging module, and the fourth aberration compensation lens group are sequentially arranged. The display is configured to emit non-polarized light; the third aberration compensation lens group is configured to perform aberration compensation on the non-polarized light emitted by the display; the polarizer is configured to transmit polarized light in non-polarized light that is obtained after the aberration compensation and that is emitted by the third aberration compensation lens group; the optical imaging module is configured to: fold an optical path, and emit the polarized light; and the fourth aberration compensation lens group is configured to perform aberration compensation on the polarized light emitted by the optical imaging module.

According to the optical imaging system provided in this embodiment, an aberration compensation function and an imaging function of the optical imaging system are separated. An aberration compensation lens group implementing the aberration compensation function is located between the display and the polarizer, and/or is located after the optical imaging module in the display, the polarizer, and the optical imaging module that are sequentially arranged. In this case, because an aberration compensation lens is not limited by a birefringent characteristic of a material, any optical resin material may be selected, so that optical resin materials having different refractive indexes are appropriately selected, to achieve relatively high imaging definition. In addition, because the optical resin material has relatively low density, a weight of the optical imaging system is effectively reduced. In addition, a size is reduced by using a polarized and folded optical path. Therefore, objectives of reducing the size and the weight and obtaining relatively high imaging definition under a relatively large FoV (for example, FoV>70°) are achieved.

In one example design, a material of an aberration compensation lens group includes optical resin. Therefore, a degree of freedom of designing an aberration compensation lens is increased, and imaging definition is effectively improved. In addition, because the optical resin material has relatively low density, the weight of the optical imaging system is effectively reduced.

In another example design, the aberration compensation lens group includes at least one aberration compensation lens, so that a quantity of aberration compensation lenses is increased, to improve imaging definition. In this embodiment of this application, the at least one may be one, two, three, or more, and this is not limited in this application.

For any aberration compensation lens in the aberration compensation lens group, in another example design, surfaces of the aberration compensation lens include a refraction surface. For example, both surfaces of the lens are refraction surfaces. Therefore, a propagation direction of light rays by using the surfaces of the aberration compensation lens is changed, to improve imaging definition.

In another example design, the aberration compensation lens includes at least one curved surface. Therefore, surface shapes of the aberration compensation lens are changed, to improve imaging definition.

With reference to the foregoing example designs, in another example design, the optical imaging module includes a first quarter-wave plate, a partial-transmission partial-reflection film, a second quarter-wave plate, and a reflective polarizer. The first quarter-wave plate, the partial-transmission partial-reflection film, the second quarter-wave plate, and the reflective polarizer are sequentially arranged. It may be understood that the first quarter-wave plate is located between the polarizer and the reflective polarizer, the second quarter-wave plate is located between the first quarter-wave plate and the reflective polarizer, and the partial-transmission partial-reflection film is located between the first quarter-wave plate and the second quarter-wave plate. The first quarter-wave plate is configured to convert first polarized light emitted by the polarizer into first circularly polarized light; the partial-transmission partial-reflection film is configured to: transmit a part of the first circularly polarized light emitted by the first quarter-wave plate, and reflect a part of second circularly polarized light emitted by the second quarter-wave plate; the second quarter-wave plate is configured to: convert the part that is of the first circularly polarized light and that is emitted by the partial-transmission partial-reflection film into second polarized light, convert the second polarized light reflected by the reflective polarizer into the second circularly polarized light, and convert the part that is of the second circularly polarized light and that is emitted by the partial-transmission partial-reflection film into first polarized light; and the reflective polarizer is configured to: reflect the second polarized light emitted by the second quarter-wave plate, and transmit the first polarized light emitted by the second quarter-wave plate.

Further, the optical imaging module further includes an imaging lens group, the imaging lens group is located between the polarizer and the reflective polarizer, and the imaging lens group is configured to transmit the first polarized light, the first circularly polarized light, the second polarized light, or the second circularly polarized light.

In an example design, the imaging lens group includes at least one imaging lens. Therefore, a quantity of the imaging lenses is increased, to improve imaging definition.

For any imaging lens in the imaging lens group, in another example design, the imaging lens is an optical resin lens. Therefore, a degree of freedom of designing the imaging lens is increased, to further reduce the size and the weight of the optical imaging system.

In another example design, the imaging lens is a glass spherical mirror. Therefore, imaging definition is improved.

With reference to the foregoing example designs, in another example design, the polarizer, the first quarter-wave plate, and an imaging lens are sequentially glued together, and the imaging lens is an imaging lens that is closest to the display in the imaging lens group. Therefore, the size of the optical imaging system is reduced.

An aberration compensation lens group is disposed between the display and the polarizer. For example, the aberration compensation lens group includes the first aberration compensation lens group and the third aberration compensation lens group. In an example design, an imaging lens, the first quarter-wave plate, the polarizer, and an aberration compensation lens are sequentially glued together, the imaging lens is an imaging lens that is closest to the display in the imaging lens group, and the aberration compensation lens is an aberration compensation lens that is farthest from the display in the aberration compensation lens group. Therefore, the size of the optical imaging system is reduced.

With reference to the foregoing designs, in another example design, the partial-transmission partial-reflection film is located on any curved surface, other than a surface that is farthest from the display, in a curved surface that is of the at least one imaging lens and that is convex towards the display. Therefore, the size of the optical imaging system is reduced.

The aberration compensation lens group is located between the display and the polarizer. For example, the aberration compensation lens group includes the first aberration compensation lens group and the third aberration compensation lens group. In another example design, the polarizer and the first quarter-wave plate are sequentially stuck to a surface that is farther from the display in two surfaces of the aberration compensation lens, the surface that is farther from the display in the two surfaces of the aberration compensation lens is a plane, and the aberration compensation lens is the aberration compensation lens that is farthest from the display in the aberration compensation lens group.

According to a second aspect, an embodiment of this application provides a head-mounted display device, including the optical imaging system described above, a processor, a memory, a bus, and a communications interface, where the memory is configured to store image data, so that when executed by the processor, the image data enables a display to display an image and emit non-polarized light.

According to a third aspect, an embodiment of this application provides an optical imaging system. The optical imaging system includes: a first aberration compensation lens group, a polarizer, and an optical imaging module, where the first aberration compensation lens group, the polarizer, and the optical imaging module are sequentially arranged. It may be understood that the first aberration compensation lens group is located before the polarizer in the polarizer and the optical imaging module that are sequentially arranged. The first aberration compensation lens group is configured to perform aberration compensation on non-polarized light emitted by a display; the polarizer is configured to transmit polarized light in non-polarized light that is obtained after the aberration compensation and that is emitted by the first aberration compensation lens group; and the optical imaging module is configured to: fold an optical path, and emit the polarized light. Alternatively, the optical imaging system includes a second aberration compensation lens group, a polarizer, and an optical imaging module, where the polarizer, the optical imaging module, and the second aberration compensation lens group are sequentially arranged. It may be understood that the second aberration compensation lens group is located after the optical imaging module in the polarizer and the optical imaging module that are sequentially arranged. The polarizer is configured to transmit polarized light in non-polarized light emitted by a display; the optical imaging module is configured to: fold an optical path, and emit the polarized light; and the second aberration compensation lens group is configured to perform aberration compensation on the polarized light emitted by the optical imaging module. Alternatively, the optical imaging system includes a third aberration compensation lens group, a fourth aberration compensation lens group, a polarizer, and an optical imaging module, where the third aberration compensation lens group, the polarizer, the optical imaging module, and the fourth aberration compensation lens group are sequentially arranged. The third aberration compensation lens group is configured to perform aberration compensation on non-polarized light emitted by a display; the polarizer is configured to transmit polarized light in non-polarized light that is obtained after the aberration compensation and that is emitted by the third aberration compensation lens group; the optical imaging module is configured to: fold an optical path, and emit the polarized light; and the fourth aberration compensation lens group is configured to perform aberration compensation on the polarized light emitted by the optical imaging module.

According to the optical imaging system provided in this embodiment of this application, an aberration compensation function and an imaging function of the optical imaging system are separated. An aberration compensation lens group implementing the aberration compensation function is located before the polarizer in the polarizer and the optical imaging module that are sequentially arranged, and/or located after the optical imaging module in the polarizer and the optical imaging module that are sequentially arranged. In this case, because the aberration compensation lens group is not limited by a birefringent characteristic of a material, any optical resin material may be selected, so that optical resin materials having different refractive indexes are appropriately selected, to achieve relatively high imaging definition. In addition, because the optical resin material has relatively low density, a weight of the optical imaging system is effectively reduced. In addition, a size is reduced by using a polarized and folded optical path. Therefore, objectives of reducing the size and the weight and obtaining relatively high imaging definition under a relatively large FoV (for example, FoV>70°) are achieved.

In an example design, a material of an aberration compensation lens group includes optical resin. Therefore, a degree of freedom of designing an aberration compensation lens is increased, and imaging definition is effectively improved.

In another example design, the aberration compensation lens group includes at least one aberration compensation lens, so that a quantity of aberration compensation lenses is increased, to improve imaging definition. In this embodiment of this application, the at least one may be one, two, three, or more, and this is not limited in this application.

For any aberration compensation lens in the aberration compensation lens group, in another example design, surfaces of the aberration compensation lens include a refraction surface. For example, both surfaces of the lens are refraction surfaces. Therefore, a propagation direction of light rays by using the surfaces of the aberration compensation lens is changed, to improve imaging definition.

In another example design, the aberration compensation lens includes at least one curved surface. Therefore, surface shapes of the aberration compensation lens are changed, to improve imaging definition.

With reference to the foregoing example designs, in another example design, the optical imaging module includes a first quarter-wave plate, a partial-transmission partial-reflection film, a second quarter-wave plate, and a reflective polarizer. The first quarter-wave plate, the partial-transmission partial-reflection film, the second quarter-wave plate, and the reflective polarizer are sequentially arranged. It may be understood that the first quarter-wave plate is located between the polarizer and the reflective polarizer, the second quarter-wave plate is located between the first quarter-wave plate and the reflective polarizer, and the partial-transmission partial-reflection film is located between the first quarter-wave plate and the second quarter-wave plate. The first quarter-wave plate is configured to convert first polarized light emitted by the polarizer into first circularly polarized light; the partial-transmission partial-reflection film is configured to: transmit a part of the first circularly polarized light emitted by the first quarter-wave plate, and reflect a part of second circularly polarized light emitted by the second quarter-wave plate; the second quarter-wave plate is configured to: convert the part that is of the first circularly polarized light and that is emitted by the partial-transmission partial-reflection film into second polarized light, convert the second polarized light reflected by the reflective polarizer into the second circularly polarized light, and convert the part that is of the second circularly polarized light and that is emitted by the partial-transmission partial-reflection film into first polarized light; and the reflective polarizer is configured to: reflect the second polarized light emitted by the second quarter-wave plate, and transmit the first polarized light emitted by the second quarter-wave plate.

Further, the optical imaging module further includes an imaging lens group, the imaging lens group is located between the polarizer and the reflective polarizer, and the imaging lens group is configured to transmit the first polarized light, the first circularly polarized light, the second polarized light, or the second circularly polarized light.

In an example design, the imaging lens group includes at least one imaging lens. Therefore, a quantity of the imaging lenses is increased, to improve imaging definition.

For any imaging lens in the imaging lens group, in another example design, the imaging lens is an optical resin lens. Therefore, a degree of freedom of designing the imaging lens is increased, to further reduce the size and the weight of the optical imaging system.

In another example design, the imaging lens is a glass spherical mirror. Therefore, imaging definition is improved.

With reference to the foregoing example designs, in another example design, the polarizer, the first quarter-wave plate, and an imaging lens are sequentially glued together, and the imaging lens is an imaging lens that is closest to the first quarter-wave plate in the imaging lens group. Therefore, the size of the optical imaging system is reduced.

With reference to the foregoing example designs, in another example design, an aberration compensation lens group is disposed before the polarizer in the polarizer and the optical imaging module that are sequentially arranged, an imaging lens, the first quarter-wave plate, the polarizer, and an aberration compensation lens are sequentially glued together, the imaging lens is an imaging lens that is closest to the first quarter-wave plate in the imaging lens group, the aberration compensation lens is an aberration compensation lens that is closest to the polarizer in the aberration compensation lens group, and the aberration compensation lens group includes the first aberration compensation lens group and the third aberration compensation lens group. Therefore, the size of the optical imaging system is reduced.

With reference to the foregoing designs, in another example design, the partial-transmission partial-reflection film is located on any curved surface, other than a surface that is farthest from the polarizer, in a curved surface that is of the at least one imaging lens and that is convex towards the polarizer. Therefore, the size of the optical imaging system is reduced.

With reference to the foregoing example designs, in another example design, the aberration compensation lens group is disposed before the polarizer in the polarizer and the optical imaging module that are sequentially arranged, the polarizer and the first quarter-wave plate are sequentially stuck to a surface that is closer to the polarizer in two surfaces of the aberration compensation lens, the surface that is closer to the polarizer in the two surfaces of the aberration compensation lens is a plane, the aberration compensation lens is the aberration compensation lens that is closest to the polarizer in the aberration compensation lens group, and the aberration compensation lens group includes the first aberration compensation lens group and the third aberration compensation lens group.

According to a fourth aspect, an embodiment of this application provides a head-mounted display device, including the optical imaging system described above, a display, a processor, a memory, a bus, and a communications interface, where the memory is configured to store image data, so that when executed by the processor, the image data enables the display to display an image and emit non-polarized light.

In addition, for technical effects brought by the design manners of any one of the foregoing aspects, refer to technical effects brought by different design manners of the first aspect and the second aspect. Details are not described herein again.

In the embodiments of this application, names of the optical imaging system and the head-mounted display device do not constitute a limitation to the devices themselves, and in actual implementation, the devices may have other names. The names belong to the scope of the claims of this application and equivalent technologies thereof provided that functions of the devices are similar to those in the embodiments of this application.

DESCRIPTION OF EMBODIMENTS

In various embodiments, the word "example", "for example", or the like, is used to represent giving an example, an illustration, or a description. Any embodiment or design scheme described as an "example" or "for example" in the embodiments of this application should not be explained as having more advantages than another embodiment or design scheme. Exactly, use of the word "example", "for example", or the like, is intended to present a related concept in a specific manner.

For clear and brief description of the following embodiments, a related technology is briefly described first.

Aberration is a difference between an actual image and an ideal image.

Figure 1:
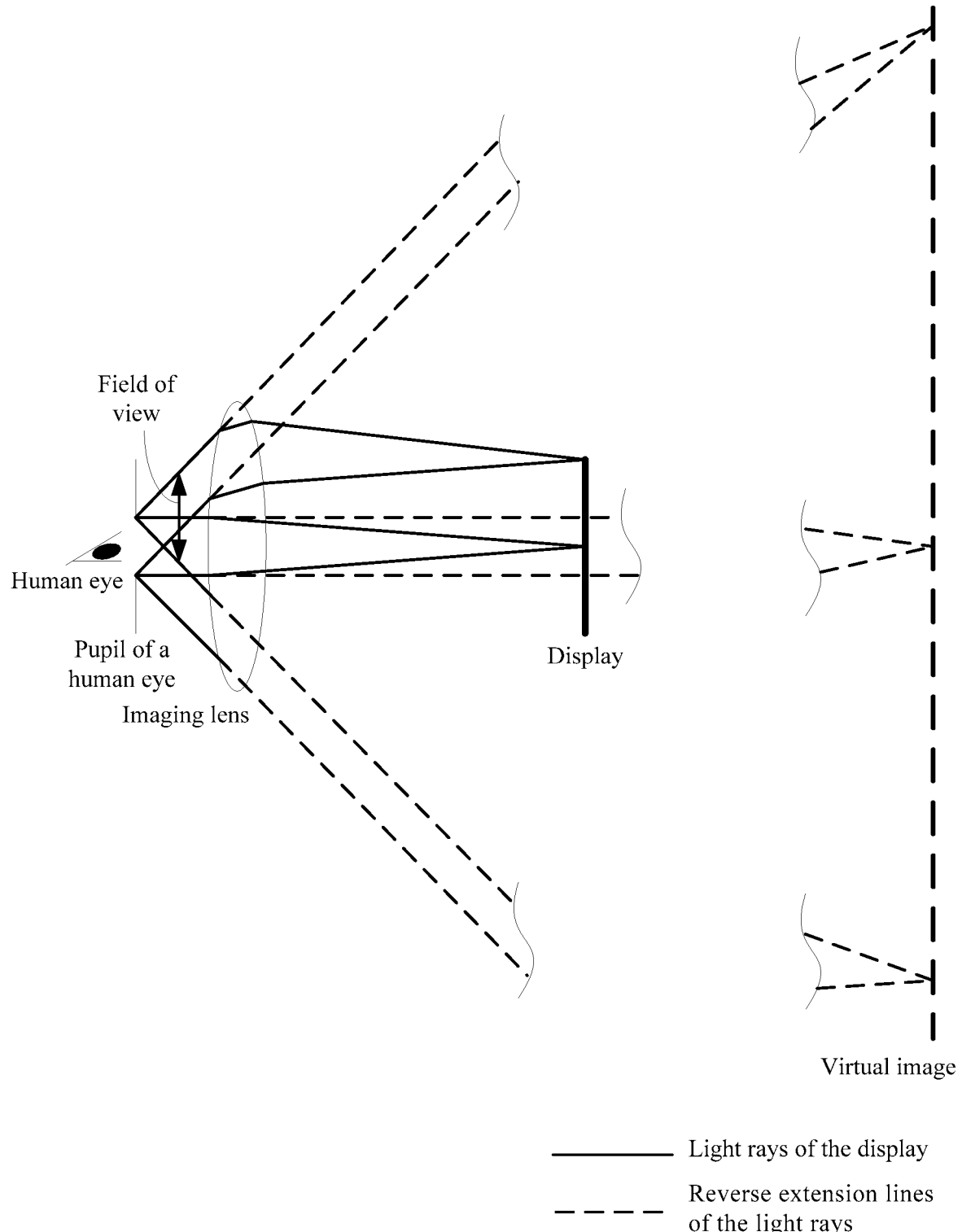
FIG. 1 is a schematic diagram of a principle of an optical imaging system according to the prior art.
Figure 2:
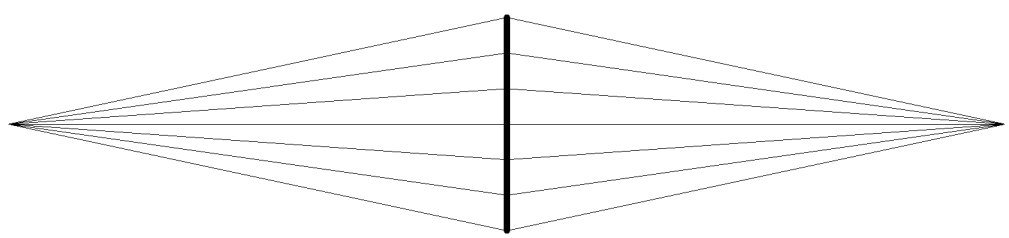
FIG. 2 is an example diagram of ideal imaging according to the prior art.
Figure 2:
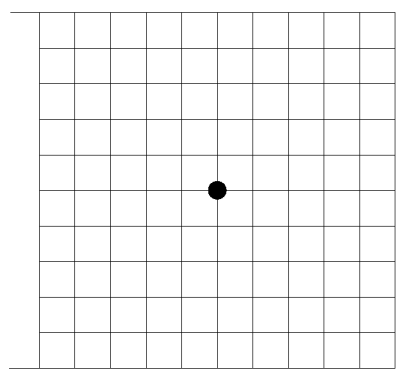

Section (a) in FIG. 2 is an example diagram of optical paths of an ideal image according to the prior art. After all light rays emitted by one infinitely small light emitting point are imaged through an ideal lens, the light rays may focus on one point to form one infinitely small image point, and the infinitely small image point is referred to as an ideal image. Section (b) in FIG. 2 is an example diagram of the ideal image according to the prior art.

Figure 3:
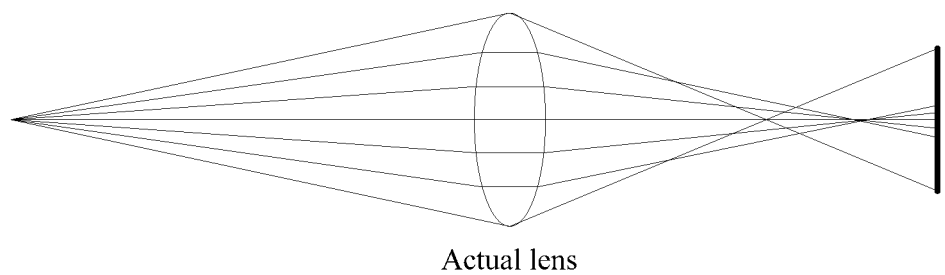
FIG. 3 is an example diagram of actual imaging according to the prior art.
Figure 3:
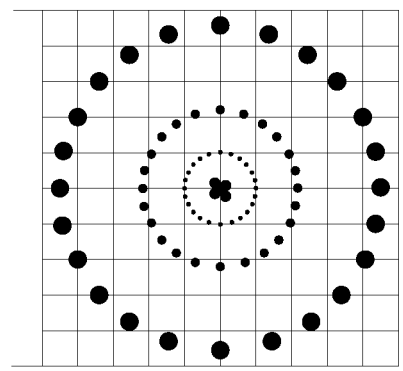

However, the ideal lens is merely an ideal model that is obtained through simplification for theoretical analysis, and does not exist in actual application. Section (a) in FIG. 3 is an example diagram of optical paths of an actual image according to the prior art. In an optical imaging system, after all light rays emitted by one infinitely small light emitting point are imaged through an actual imaging lens, the light rays cannot focus on one point, but form blurred spots. The blurred spot is referred to as an actual image. Section (b) in FIG. 3 is an example diagram of the actual image according to the prior art. A reason is as follows: in an ideal optical imaging analyzing process, a formula of the law of refraction is simplified to some extent. For example, "sin θ=θ", where θ indicates an included angle between a light ray and an optical axis. When θ is relatively small, the formula is true, and when θ is relatively large, the formula is false.

$$\sin\theta = \theta - \frac{\theta^3}{3!} + \frac{\theta^5}{5!} - \frac{\theta^7}{7!} + \cdots$$

is obtained through series expansion of the sin function, sin θ includes many high order terms, and the high order terms are a reason of generating aberration. A size of a blurred spot is related to aberration of the optical imaging system. A larger blurred spot indicates higher aberration, and a smaller blurred spot indicates lower aberration.

In the prior art, except plane mirror imaging, there is no optical imaging system without aberration. Because all optical energy receivers have particular resolution, for example, human eyes or a charge-coupled device (charge-coupled device, CCD), it is unnecessary to completely eliminate aberration. Image quality can be considered to be relatively high provided that in an optical imaging process, aberration is corrected to a range based on requirements to enable the aberration to be unobservable to an optical energy receiver. Aberration correction may also be referred to as aberration compensation.

Generally, a larger field of view and a larger difference between sizes of an object and an image indicate higher aberration. In addition, higher aberration indicates that more variable parameters are needed in the optical imaging system. In this way, aberration correction can be implemented. Aberration is jointly determined by specific materials and surface shapes of optical elements included in the optical imaging system. Therefore, aberration can be corrected to a range by appropriately configuring material characteristics of the optical elements in the optical imaging system, parameters of surface shapes of effective optical elements, and a position relationship between different optical elements. For example, a quantity of imaging lenses may be increased, or a quantity of available optical surfaces may be increased, or some surfaces of an imaging lens are set to aspherical surfaces or freeform surfaces to increase variable parameters, or a selection range of material types of the imaging lens is expanded to increase an opportunity of reducing aberration.

Figure 4:
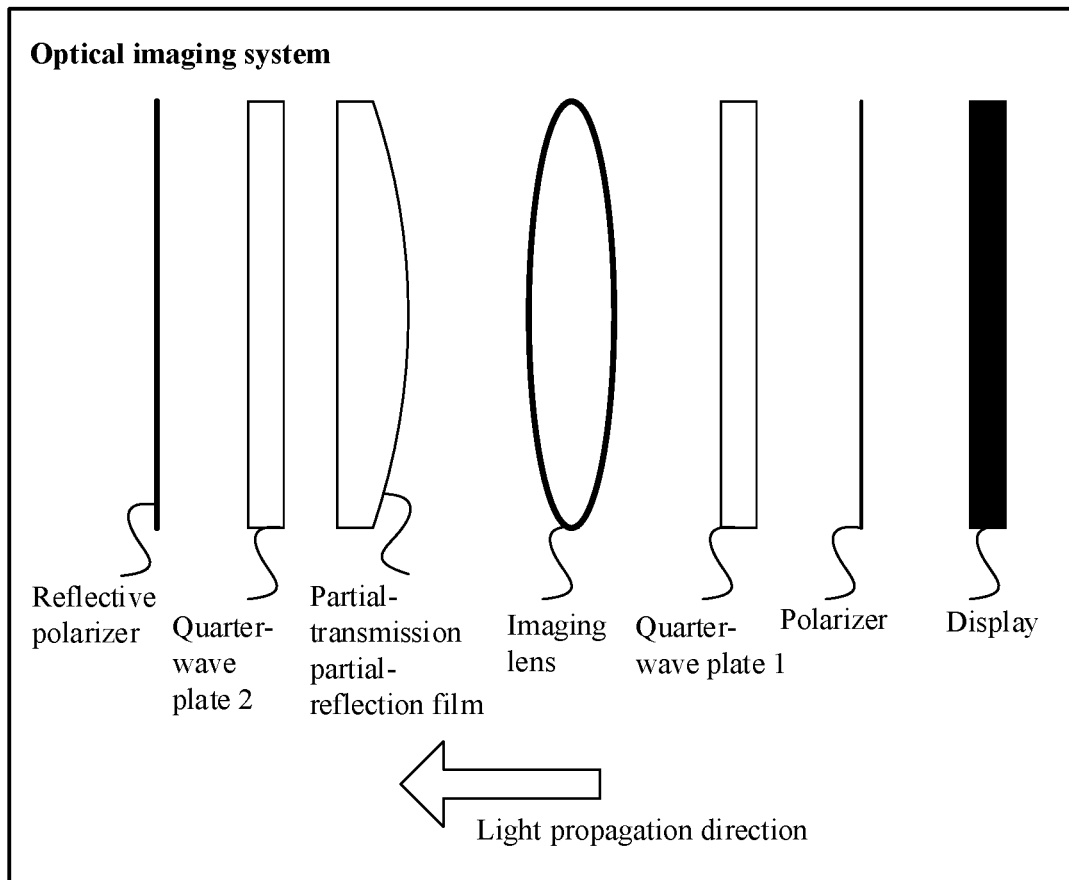
FIG. 4 is an example structural diagram of an optical imaging system according to the prior art.

For example, FIG. 4 is an example structural diagram of an optical imaging system according to the prior art. The optical imaging system includes a display, a polarizer (polarizer), a quarter-wave plate (quarter-wave plate) 1, a partial-transmission partial-reflection film, a quarter-wave plate 2, a reflective polarizer (reflective polarizer, RP), and an imaging lens. The display, the polarizer, the quarter-wave plate 1, the partial-transmission partial-reflection film, the quarter-wave plate 2, and the reflective polarizer are sequentially arranged according to a principle of an optical path. The imaging lens is located between any two neighboring optical elements in the polarizer, the quarter-wave plate 1, the partial-transmission partial-reflection film, the quarter-wave plate 2, and the reflective polarizer. For example, as shown in FIG. 4, the imaging lens is located between the quarter-wave plate 1 and the partial-transmission partial-reflection film.

The polarizer is an optical element that can convert natural light into polarized light. The polarizer may be classified into a natural polarizer and an artificial polarizer. The natural polarizer is made of a crystal. The artificial polarizer is a composite material made by laminating a polarization film, an inner protective film, a pressure-sensitive adhesive layer, and an outer protective film. Polarizers may be classified into two types: a black and white polarizer and a color polarizer, based on a background color polarizer of the polarizer. Polarizers may be classified into three types: a transmissive type, a transflective type, and a reflection-transmission type, according to application of the polarizer. In this embodiment, the polarizer is an absorptive polarizer (absorptive polarizer). The polarizer has functions of shielding and transmitting incident light. For example, the polarizer may transmit longitudinal light and shield horizontal light, or transmit horizontal light and shield longitudinal light.

The quarter-wave plate may also be referred to as a 45-degree phase retarder. The quarter-wave plate is made of a birefringent material. When an included angle between a light vector of linearly polarized light and a fast axis or a slow axis of the quarter-wave plate is ±45°, light passing through the quarter-wave plate is circularly polarized light; or otherwise, circularly polarized light is converted into linearly polarized light through the quarter-wave plate.

The partial-transmission partial-reflection film is a film that can partially transmit and partially reflect incident light. For example, the partial-transmission partial-reflection film is a film whose transmissivity and reflectivity are both 50%. Transmission is a phenomenon that incident light is refracted, then passes through an object, and then exits. An object through which light is transmitted is a transparent object or a translucent object, for example, glass or a color filter. If the transparent object is colorless, a small part of light is reflected and most of the light passes through the object. To indicate a degree at which light passes through an object, usually, a ratio of light intensity of light obtained after incident light passes through a film to light intensity of the incident light is used to represent transmissivity (transmissivity). A ratio of light intensity of reflected light to the light intensity of the incident light is used to represent reflectivity (reflectivity).

The imaging lens is an optical element made of a transparent substance. A material of the imaging lens may be glass or optical resin. The optical resin is an organic compound that facilitates injection molding or compression molding, that is not fragile, and that has good light transmittance, and density is less than 1.6 g/cm³. A glass lens may also be referred to as a phase-independent imaging lens. An optical resin lens may also be referred to as a phase-dependent imaging lens. The phase-independent imaging lens means that when light passes through the component, no phase difference is introduced for light having different polarization directions, or that the component has no birefringent effect. The phase-dependent imaging lens means that when light passes through the component, a polarization characteristic changes, thereby leading to stray light or ghosting, and the component has a birefringent effect, thereby reducing imaging definition. For example, the component transmits elliptically polarized light instead of linearly polarized light (P light or S light), or transmits elliptically polarized light instead of circularly polarized light. Usually, the imaging lens used in the optical imaging system is a glass lens. In addition, to further improve imaging definition, a quantity of imaging lenses in the optical imaging system may be increased to perform aberration compensation, to improve imaging definition.

Although using the glass lens and increasing the quantity of imaging lenses can improve imaging definition, because density of glass is 2 to 6 times higher than that of plastics, a size and a weight of the optical imaging system are greatly increased. The optical imaging system may be applied to a VR device, and it is equivalent to that a size and a weight of the VR device are increased. Therefore, how to reduce a size and a weight of an optical imaging system and obtain relatively high imaging definition under a relatively large FoV (for example, FoV>70°) is a problem urgently to be resolved.

To resolve the foregoing problem, various embodiments provide an optical imaging system. A basic principle of the optical imaging system is that an aberration compensation function and an imaging function of the optical imaging system can be separated. An aberration compensation lens group implementing the aberration compensation function is located before a polarizer in the polarizer and an optical imaging module that are sequentially arranged, and/or located after the optical imaging module in the polarizer and the optical imaging module that are sequentially arranged. In this case, because the aberration compensation lens group is not limited by a birefringent characteristic of a material, any optical resin material may be selected, so that optical resin materials having different refractive indexes are appropriately selected, to achieve relatively high imaging definition. In addition, because the optical resin material has relatively low density, a weight of the optical imaging system is effectively reduced. In addition, an imaging lens that implements main light refraction is located between a reflective polarizer and the polarizer, to reduce a size by using a polarized and folded optical path. Therefore, objectives of reducing the size and the weight and obtaining relatively high imaging definition under a relatively large FoV (for example, FoV>70°) are achieved.

The following describes various example implementations of various embodiments in detail with reference to the accompanying drawings.

Figure 5:
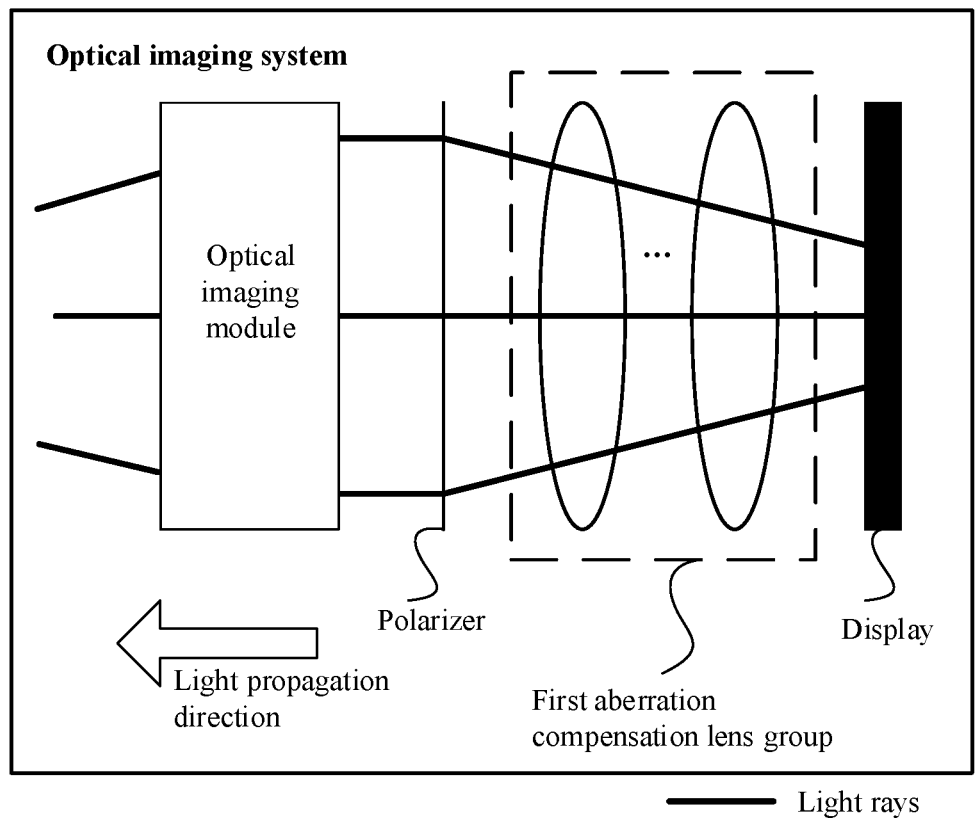
FIG. 5 is a first example structural diagram of an optical imaging system according to an embodiment of this application.

FIG. 5 is a first example structural diagram of an optical imaging system according to one embodiment in accordance. The optical imaging system includes a first aberration compensation lens group, a polarizer, an optical imaging module, and a display. The display, the first aberration compensation lens group, the polarizer, and the optical imaging module are sequentially arranged. It may be understood that the first aberration compensation lens group is located between the display and the polarizer, and the optical imaging module is located after the polarizer in the display, the first aberration compensation lens group, and the polarizer that are sequentially arranged.

Because the first aberration compensation lens group is not limited by a birefringent characteristic of a material, a material of the first aberration compensation lens group may be any optical resin material. Therefore, optical resin materials having different refractive indexes are appropriately selected for the first aberration compensation lens group, to achieve relatively high imaging definition. In addition, because the optical resin material has relatively low density, a weight of the optical imaging system is effectively reduced.

The first aberration compensation lens group may include at least one aberration compensation lens. Therefore, a quantity of the aberration compensation lenses is increased, to improve imaging definition. In this embodiment, the at least one may be one, two, three, or more, and this is not limited in this embodiment of this application.

For any aberration compensation lens in the first aberration compensation lens group, surfaces of the aberration compensation lens include a refraction surface. For example, one surface of the aberration compensation lens is a diffraction surface, and the other surface is a refraction surface, or two surfaces of the aberration compensation lens are both refraction surfaces. In addition, the aberration compensation lens may alternatively include at least one curved surface. For example, one surface of the aberration compensation lens is a curved surface, and the other surface is a plane, or two surfaces of the aberration compensation lens are both curved surfaces. In actual application, a combination of a material, surfaces, and surface shapes of the aberration compensation lens may be set based on magnitude of aberration needing aberration compensation. Therefore, a propagation direction of light rays by using the surfaces of the aberration compensation lens and the surface shapes of the aberration compensation lens are changed, to improve imaging definition.

Figure 6:
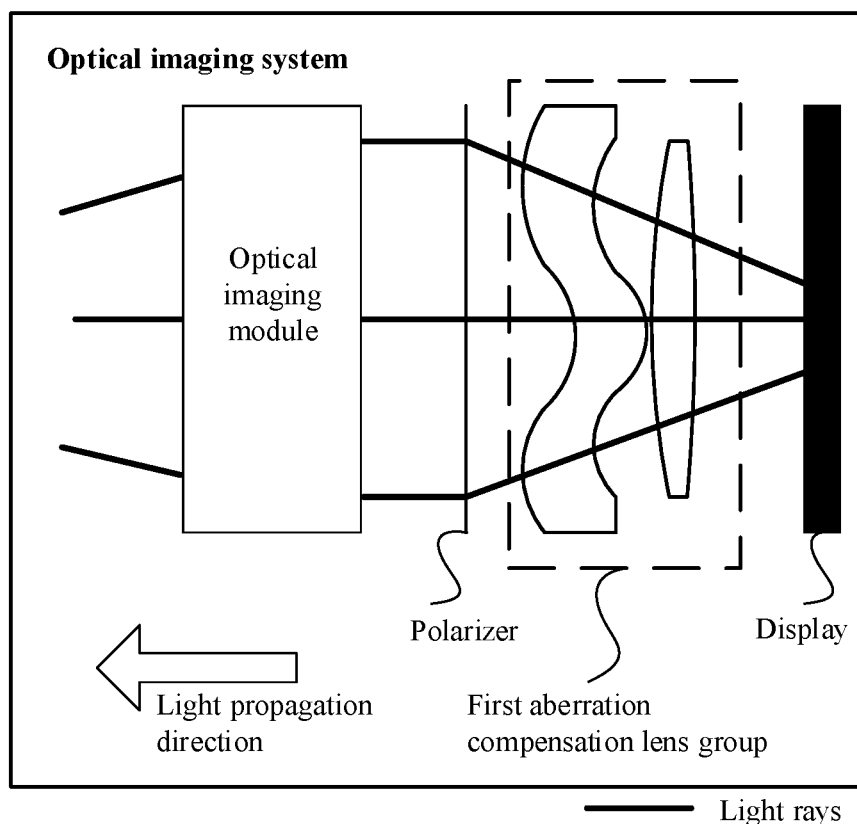
FIG. 6 is a second example structural diagram of an optical imaging system according to an embodiment of this application.

When the first aberration compensation lens group includes at least two aberration compensation lenses, surfaces, being refraction surfaces or diffraction surfaces, of each of the at least two aberration compensation lenses, surface shapes, being a curved surface or a plane, of each of the at least two aberration compensation lenses, and materials of the aberration compensation lenses may be combined arbitrarily based on magnitude of aberration. This is not limited in this embodiment. For example, as shown in FIG. 6, the first aberration compensation lens group includes two aberration compensation lenses, surfaces of both aberration compensation lenses included in the first aberration compensation lens group are all refraction surfaces, and surface shapes of both aberration compensation lenses included in the first aberration compensation lens group are all curved surfaces.

For explanations of the polarizer, refer to detailed descriptions in the foregoing embodiment. The polarizer in this embodiment of this application is an absorptive polarizer. The polarizer has functions of shielding and transmitting incident light. For example, the polarizer may transmit longitudinal light and shield horizontal light, or transmit horizontal light and shield longitudinal light.

The display is configured to emit non-polarized light. The non-polarized light is light rays that vibrate in all directions. The non-polarized light herein may be understood as divergent light emitted by an image displayed by the display.

The first aberration compensation lens group is configured to perform aberration compensation on the non-polarized light emitted by the display. A specific aberration compensation method may be: adjusting a material of the aberration compensation lens included in the first aberration compensation lens group, surfaces of the aberration compensation lens, surface shapes of the aberration compensation lens, a quantity of the aberration compensation lenses, and the like based on magnitude of aberration, to perform aberration compensation on the non-polarized light emitted by the display, to reduce a difference between an actual image and an original image.

The polarizer is configured to transmit polarized light in non-polarized light that is obtained after the aberration compensation and that is emitted by the first aberration compensation lens group. Polarized light (polarized light) is a light wave in which a vibration direction of a light vector does not change, or a light wave having a regular change. The polarized light may be classified into plane polarized light, circularly polarized light, elliptically polarized light, and partially polarized light based on property of the polarized light. If a vibration direction of a light vector is limited only to a determined plane, the polarized light is referred to as plane polarized light. Because the vibration direction is a straight line in a propagation process, the plane polarized light may also be referred to as linearly polarized light. If a light vector regularly changes with time, that is, a track of a tail end of an electric vector is presented as a circle or an ellipse on a plane that is perpendicular to a propagation direction, the polarized light is referred to as circularly polarized light or elliptically polarized light. If vibration of a light vector has a relative advantage only in a determined direction in a propagation process, the polarized light is referred to as partially polarized light. In this embodiment of this application, the polarized light transmitted by the polarizer is linearly polarized light. The linearly polarized light may be P light or S light. It may be understood that the non-polarized light includes both P light and S light. P light is a light ray whose polarization direction is parallel to a reference plane, the reference plane is related to a structure of the polarizer, and S light is a light ray whose polarization direction is perpendicular to the reference plane. Generally, the polarizer transmits the P light and shields the S light.

The optical imaging module is configured to: fold an optical path, and emit the polarized light.

The optical imaging module may include different optical elements, to fold the optical path, and specifically, the following implementations may be included.

Figure 7:
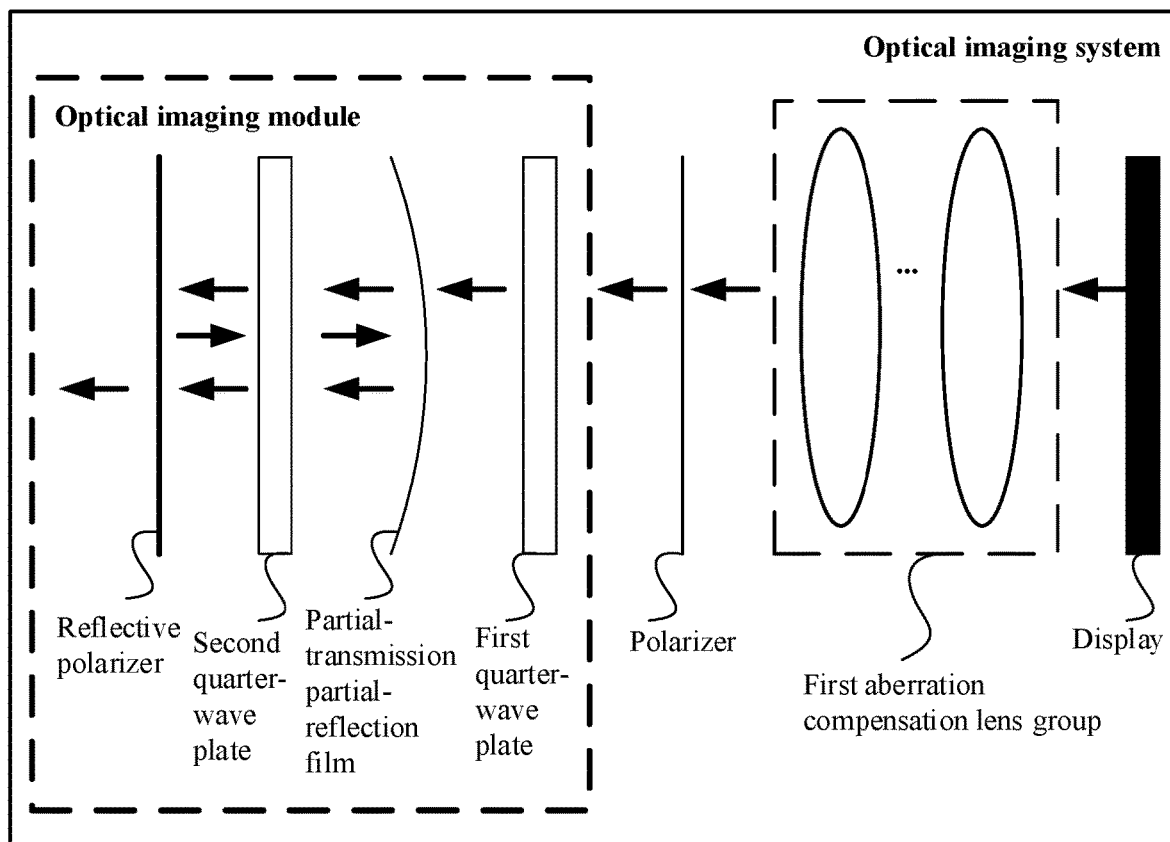
FIG. 7 is a third example structural diagram of an optical imaging system according to an embodiment of this application.

In a first example implementation, as shown in FIG. 7, the optical imaging module includes a first quarter-wave plate, a partial-transmission partial-reflection film, a second quarter-wave plate, and a reflective polarizer. The first quarter-wave plate, the partial-transmission partial-reflection film, the second quarter-wave plate, and the reflective polarizer are sequentially arranged. It may be understood that the first quarter-wave plate is located between the polarizer and the reflective polarizer, the second quarter-wave plate is located between the first quarter-wave plate and the reflective polarizer, and the partial-transmission partial-reflection film is located between the first quarter-wave plate and the second quarter-wave plate.

The first quarter-wave plate is configured to convert first polarized light emitted by the polarizer into first circularly polarized light. In this embodiment, it is assumed that the first polarized light is P light. The first circularly polarized light is a light ray whose phase delay is an odd multiple of $\pi/2$.

The partial-transmission partial-reflection film is configured to transmit a part of the first circularly polarized light emitted by the first quarter-wave plate.

The second quarter-wave plate is configured to convert the part that is of the first circularly polarized light and that is emitted by the partial-transmission partial-reflection film into second polarized light. The second polarized light is S light.

The reflective polarizer is configured to reflect the second polarized light emitted by the second quarter-wave plate.

The second quarter-wave plate is further configured to convert the second polarized light reflected by the reflective polarizer into second circularly polarized light. The second circularly polarized light is a light ray, where a difference between a phase delay of the light ray and the phase delay of the first circularly polarized light is an odd multiple of $\pi$.

The partial-transmission partial-reflection film is further configured to reflect a part of the second circularly polarized light emitted by the second quarter-wave plate.

The second quarter-wave plate is further configured to convert the part that is of the second circularly polarized light and that is emitted by the partial-transmission partial-reflection film into first polarized light.

The reflective polarizer is further configured to transmit the first polarized light emitted by the second quarter-wave plate. The reflective polarizer may be implemented arbitrarily. For example, the reflective polarizer uses a wire grid coating film or a multi-layer high polymer film provided that a characteristic is that linearly polarized light in a polarization direction is reflected and linearly polarized light in a polarization direction perpendicular to the polarization direction is transmitted. For example, the reflective polarizer transmits the P light and shields the S light.

In a second example implementation, the optical imaging module may further include an imaging lens group. The imaging lens group is located between the polarizer and the reflective polarizer. Regardless of a specific position of the imaging lens group between the polarizer and the reflective polarizer, a polarization characteristic of incident light is not changed. In other words, if incident light is circularly polarized light, emergent light is still circularly polarized light, or if incident light is linearly polarized light, and emergent light is still linearly polarized light. If incident light is the P light, emergent light is still the P light. The imaging lens group is configured to transmit the first polarized light, the first circularly polarized light, the second polarized light, or the second circularly polarized light.

Figure 8:
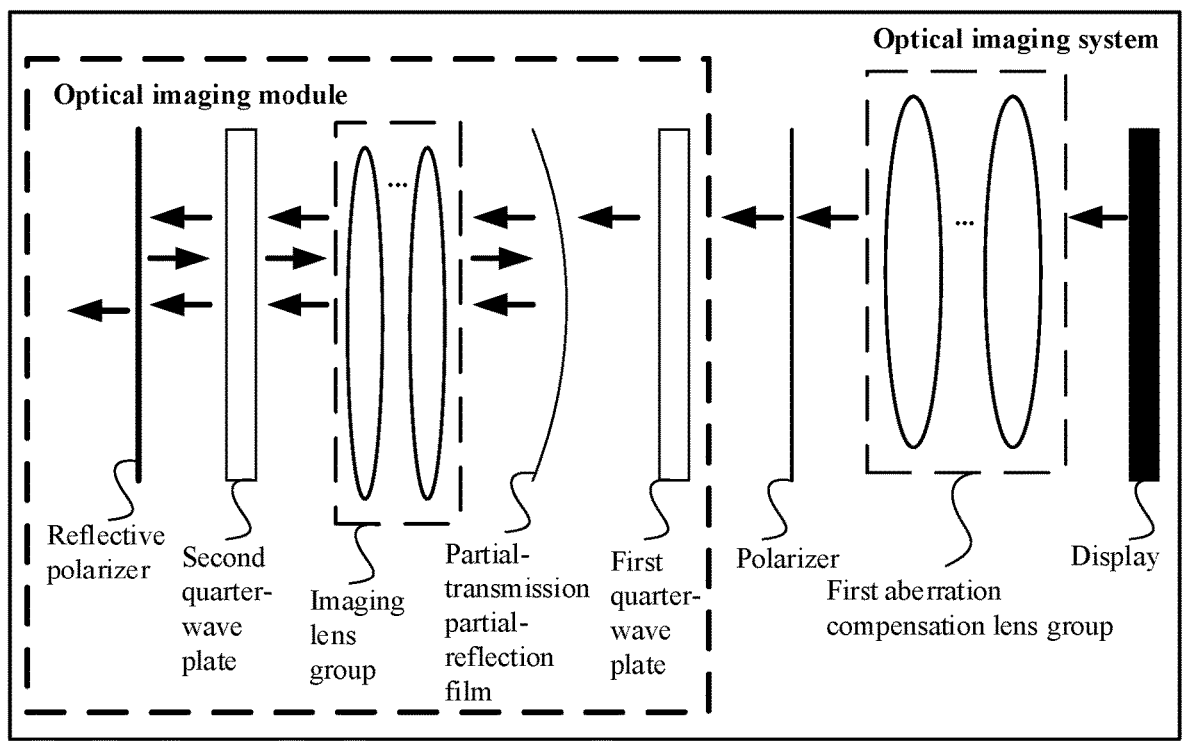
FIG. 8 is a fourth example structural diagram of an optical imaging system according to an embodiment of this application.

For example, as shown in FIG. 8, the imaging lens group is located between the partial-transmission partial-reflection film and the second quarter-wave plate.

The first quarter-wave plate is configured to convert first polarized light emitted by the polarizer into first circularly polarized light. In this embodiment of this application, it is assumed that the first polarized light is P light. The first circularly polarized light is a light ray whose phase delay is an odd multiple of $\pi/2$.

The partial-transmission partial-reflection film is configured to transmit a part of the first circularly polarized light emitted by the first quarter-wave plate.

The imaging lens group is configured to transmit the first circularly polarized light emitted by the partial-transmission partial-reflection film.

The second quarter-wave plate is configured to convert the part that is of the first circularly polarized light and that is emitted by the imaging lens group into second polarized light. The second polarized light is S light.

The reflective polarizer is configured to reflect the second polarized light emitted by the second quarter-wave plate.

The second quarter-wave plate is further configured to convert the second polarized light reflected by the reflective polarizer into second circularly polarized light. The second circularly polarized light is a light ray, where a difference between a phase delay of the light ray and the phase delay of the first circularly polarized light is an odd multiple of $\pi$.

The imaging lens group is further configured to transmit the second circularly polarized light emitted by the second quarter-wave plate.

The partial-transmission partial-reflection film is further configured to reflect a part of the second circularly polarized light emitted by the second quarter-wave plate.

The imaging lens group is further configured to transmit the part that is of the second circularly polarized light and that is emitted by the partial-transmission partial-reflection film.

The second quarter-wave plate is further configured to convert the part that is of the second circularly polarized light and that is emitted by the imaging lens group into first polarized light.

The reflective polarizer is further configured to transmit the first polarized light emitted by the second quarter-wave plate.

The imaging lens group includes at least one imaging lens. Therefore, a quantity of the imaging lenses is increased, to improve imaging definition.

It should be noted that for any imaging lens in the imaging lens group, the imaging lens may be a glass spherical mirror. The imaging lens includes at least one spherical surface. For example, one surface of the imaging lens is a spherical surface, and the other surface is a plane, or two surfaces of the imaging lens are both spherical surfaces.

To reduce a size and a weight of the optical imaging system, the imaging lens may alternatively be an optical resin lens. In this case, the imaging lens may further include any curved surface. To reduce as far as example impact caused by a birefringent effect of the optical resin lens on imaging definition, an optical resin lens having a relatively low birefringent effect may be selected. In addition, to compensate for aberration, the surface shapes of the aberration compensation lens in the first aberration compensation lens group also need to be adaptively adjusted based on the imaging lens.

Figure 9:
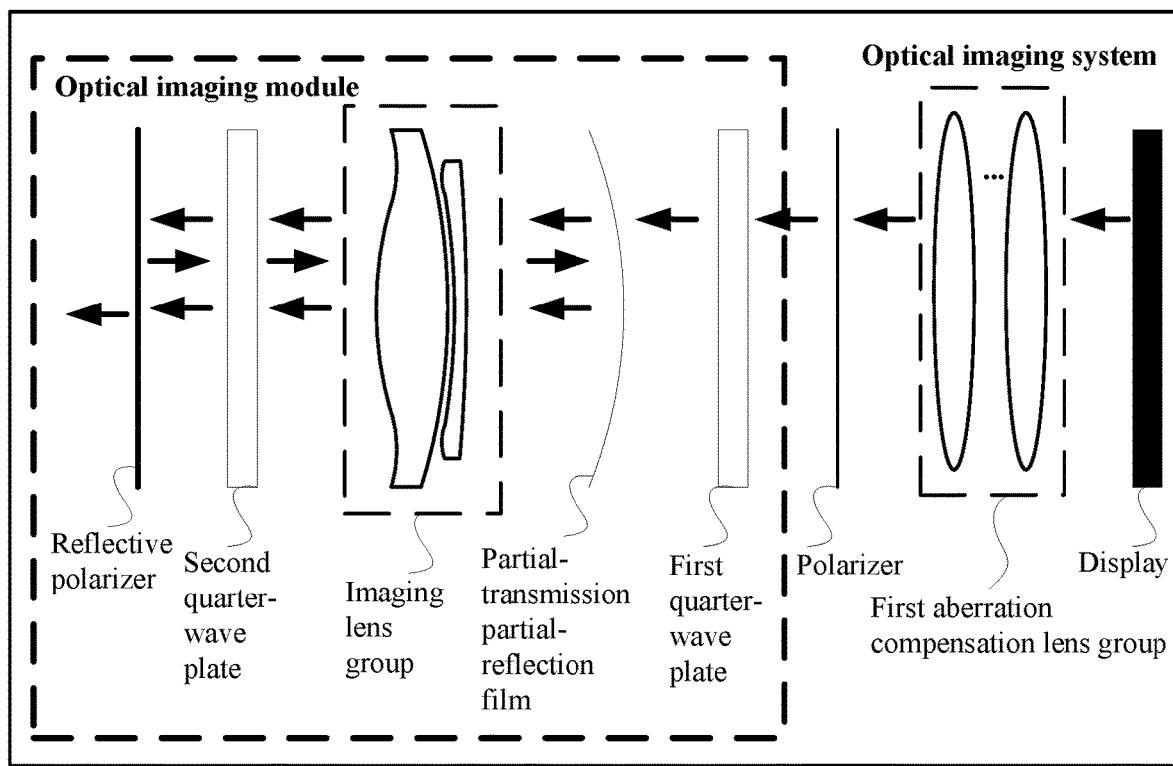
FIG. 9 is a fifth example structural diagram of an optical imaging system according to an embodiment of this application.

When the imaging lens group includes at least two imaging lenses, surfaces, being spherical surfaces or planes, of each of the at least two imaging lenses, and materials of the imaging lenses may be combined arbitrarily based on imaging definition. This is not limited in this embodiment of this application. For example, as shown in FIG. 9, the imaging lens group includes two imaging lenses, and surface shapes of both imaging lenses included in the imaging lens group are all curved surfaces.

Figure 10:
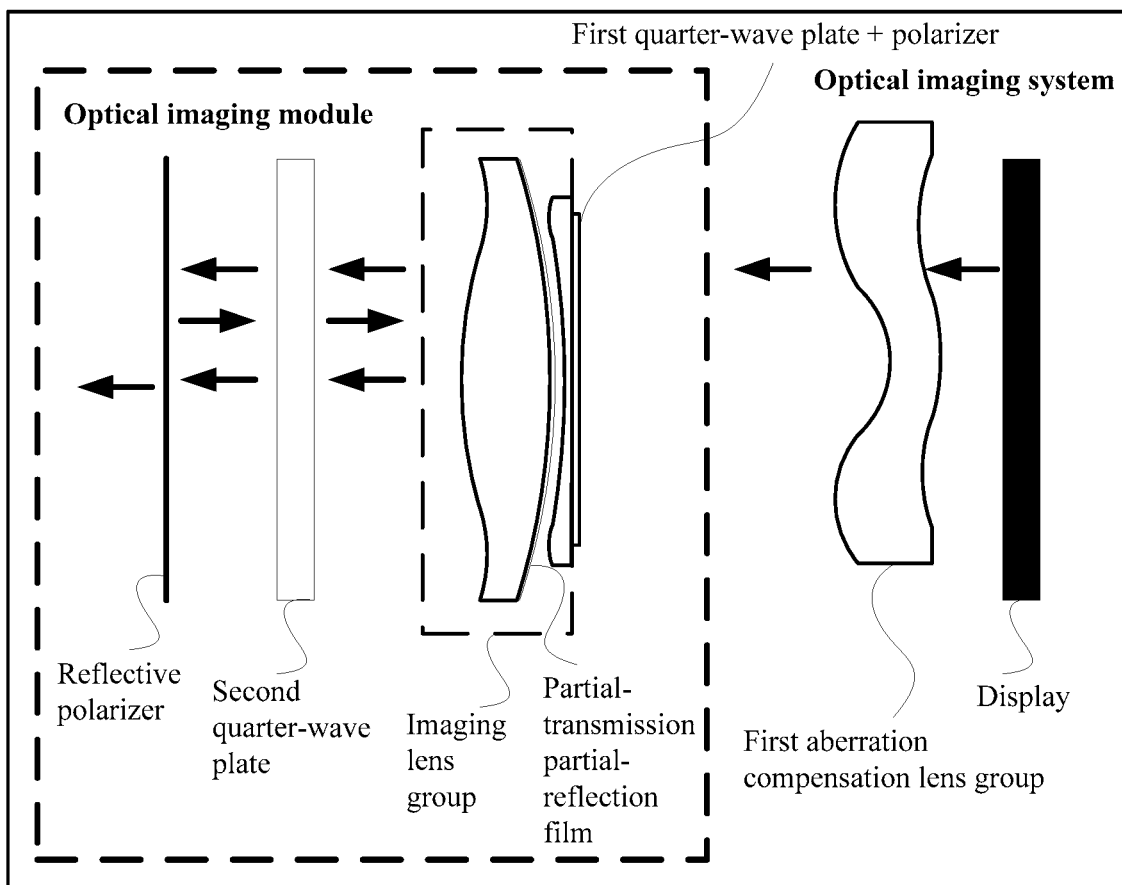
FIG. 10 is a sixth example structural diagram of an optical imaging system according to an embodiment of this application.

The polarizer and the first quarter-wave plate may be stuck to a substrate. Optionally, to reduce the size of the optical imaging system, the polarizer, the first quarter-wave plate, and an imaging lens are sequentially glued together. It may be understood that the first quarter-wave plate is stuck to the imaging lens, and then the polarizer is stuck to the first quarter-wave plate. The imaging lens is an imaging lens that is closest to the display in the imaging lens group. For example, if the imaging lens group includes one imaging lens, the first quarter-wave plate is stuck to a first surface of the imaging lens, and then the polarizer is stuck to the first quarter-wave plate. The first surface of the imaging lens is a surface that is closer to the display in two surfaces of the imaging lens, and the first surface of the imaging lens may be a plane. A second surface of the imaging lens is a surface that is farther from the display in the two surfaces of the imaging lens. If the imaging lens group includes at least two imaging lenses, the polarizer, the first quarter-wave plate, and a first surface of an imaging lens that is closest to the display are sequentially glued together. In addition, the partial-transmission partial-reflection film is a coating film. If the imaging lens group includes at least two imaging lenses, the partial-transmission partial-reflection film may be located in any position between the at least two imaging lenses, and is stuck to a surface that is of a lens and that is convex towards the display. For example, as shown in FIG. 10, the partial-transmission partial-reflection film is located between two lenses, and the partial-transmission partial-reflection film is stuck to a convex surface of a lens that is farther from the display. The first aberration compensation lens group includes one aberration compensation lens, surface shapes of the aberration compensation lens are both curved surfaces, and both surfaces of the aberration compensation lens are refraction surfaces.

In some embodiments, the partial-transmission partial-reflection film may alternatively be stuck to a surface that is in surfaces of the imaging lenses included in the imaging lens group, that is farthest from the display, and that is convex towards the display. Alternatively, the partial-transmission partial-reflection film may be stuck to a surface that is in surfaces of the imaging lenses included in the imaging lens group, that is farthest from the display, and that is concave towards the display. It may be understood that a convex surface of an imaging lens may be a surface on which a center point of the surface is closer to the display than an edge point. Likewise, a surface that is of an imaging lens and that is concave towards the display may be a surface on which a center point of the surface is closer to the display than an edge point.

In some embodiments, if the imaging lens group includes one imaging lens, the partial-transmission partial-reflection film may be located between the first quarter-wave plate and a first surface of the imaging lens. To be specific, the partial-transmission partial-reflection film is stuck to the first surface of the imaging lens, the first quarter-wave plate is stuck to the partial-transmission partial-reflection film, and then the polarizer is stuck to the first quarter-wave plate.

In some embodiments, when the imaging lens group includes at least two imaging lenses, the partial-transmission partial-reflection film may be located on any curved surface, other than a surface that is farthest from the display, in curved surfaces that are of the at least two imaging lenses and that are convex towards the display.

Figure 11:
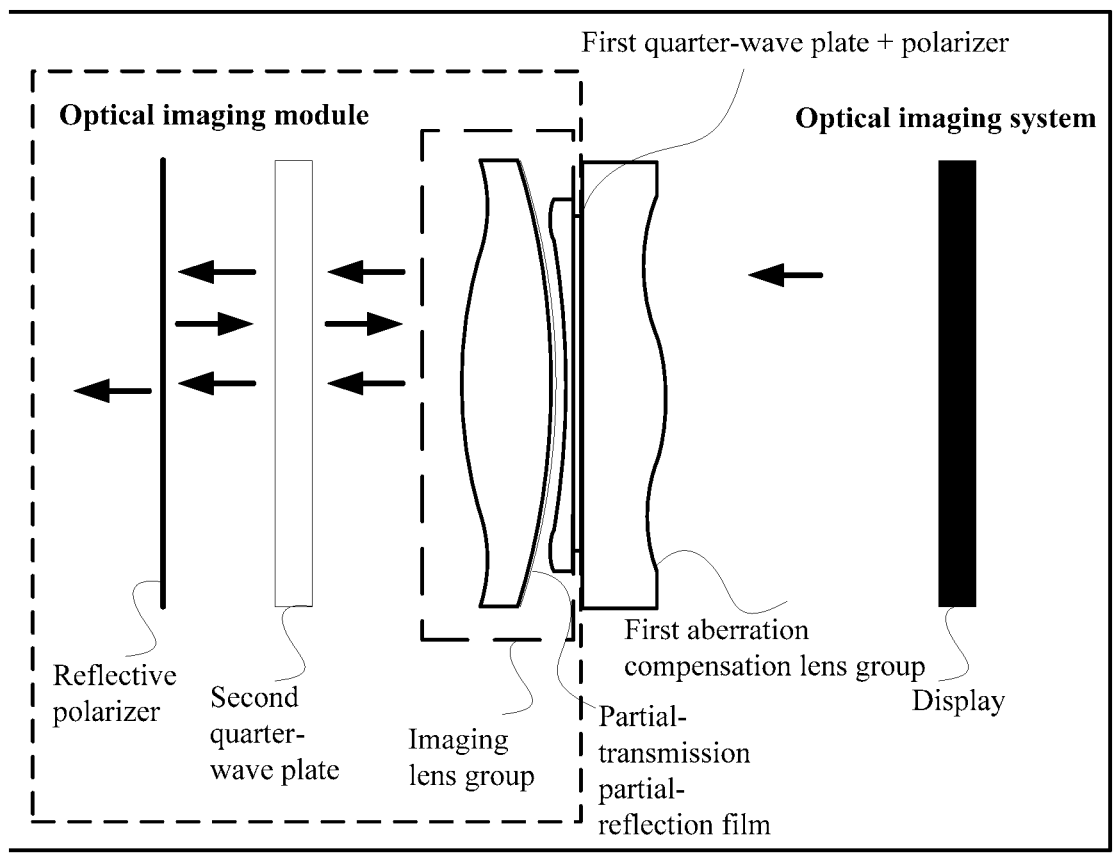
FIG. 11 is a seventh example structural diagram of an optical imaging system according to an embodiment of this application.

In some embodiments, if the imaging lens group is disposed between the first quarter-wave plate and the partial-transmission partial-reflection film, the first aberration compensation lens group is disposed between the display and the polarizer. An aberration compensation lens, the polarizer, the first quarter-wave plate, and an imaging lens are sequentially glued together. It may be understood that the polarizer is stuck to the aberration compensation lens, then the first quarter-wave plate is stuck to the polarizer, and then the imaging lens is stuck to the first quarter-wave plate. The imaging lens is an imaging lens that is closest to the display in the imaging lens group, and the aberration compensation lens is an aberration compensation lens that is farthest from the display in the first aberration compensation lens group. Therefore, the size of the optical imaging system is reduced. For example, as shown in FIG. 11, the first aberration compensation lens group includes one aberration compensation lens, and the imaging lens group includes two imaging lenses. The aberration compensation lens, the polarizer, the first quarter-wave plate, and an imaging lens that is closer to the display are sequentially glued together. The partial-transmission partial-reflection film is stuck to a convex surface of an imaging lens that is farther from the display. It should be noted that surfaces for gluing the aberration compensation lens, the polarizer, the first quarter-wave plate, and the imaging lens may be planes. Certainly, with the development of technologies, the surfaces for gluing the aberration compensation lens, the polarizer, the first quarter-wave plate, and the imaging lens may alternatively be curved surfaces.

Figure 12:
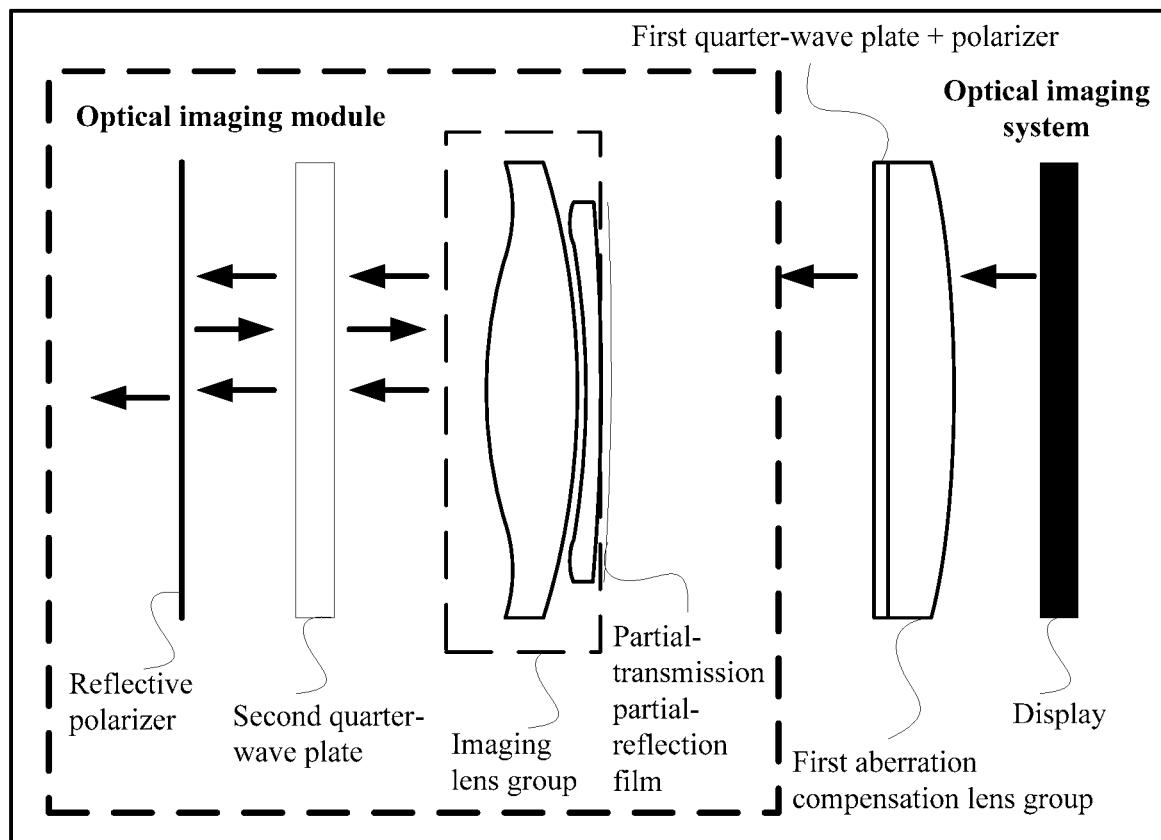
FIG. 12 is an eighth example structural diagram of an optical imaging system according to an embodiment of this application.

In some embodiments, the first aberration compensation lens group is disposed between the display and the polarizer, and both the polarizer and the first quarter-wave plate are films. When a second surface of an aberration compensation lens is a plane, the polarizer and the first quarter-wave plate may sequentially be stuck to the second surface of the aberration compensation lens. It may be understood that the polarizer is stuck to the second surface of the aberration compensation lens, and then the first quarter-wave plate is stuck to the polarizer. The second surface of the aberration compensation lens is a surface that is farther from the display in two surfaces of the aberration compensation lens. A first surface of the aberration compensation lens is a surface that is closer to the display in the two surfaces of the aberration compensation lens. The aberration compensation lens is an aberration compensation lens that is farthest from the display in the first aberration compensation lens group. Therefore, the size of the optical imaging system is reduced. For example, as shown in FIG. 12, the first aberration compensation lens group includes one aberration compensation lens, and the imaging lens group includes two imaging lenses. The polarizer and the first quarter-wave plate are sequentially stuck to the second surface of the aberration compensation lens. The partial-transmission partial-reflection film is stuck to a convex surface of an imaging lens that is closer to the display. It should be noted that with the development of technologies, when the aberration compensation lens has a curved surface, the polarizer and the first quarter-wave plate may also be stuck to a curved surface of the imaging lens or the curved surface of the aberration compensation lens. This is not limited in this embodiment of this application.

In addition, the second quarter-wave plate and the reflective polarizer may be stuck to the substrate, or may be stuck to an imaging lens that is farthest from the display.

According to the optical imaging system provided in this embodiment, an aberration compensation function and an imaging function of the optical imaging system are separated. The first aberration compensation lens group implementing the aberration compensation function is disposed between the display and the polarizer. In this case, because an aberration compensation lens is not limited by a birefringent characteristic of a material, any optical resin material may be selected, so that optical resin materials having different refractive indexes are appropriately selected, to achieve relatively high imaging definition. In addition, because the optical resin material has relatively low density, a weight of the optical imaging system is effectively reduced. In addition, an imaging lens that implements main light refraction is located between the reflective polarizer and the polarizer, to reduce the size by using a polarized and folded optical path. Therefore, objectives of reducing the size and the weight and obtaining relatively high imaging definition under a relatively large FoV (for example, FoV>70°) are achieved.

Figure 13:
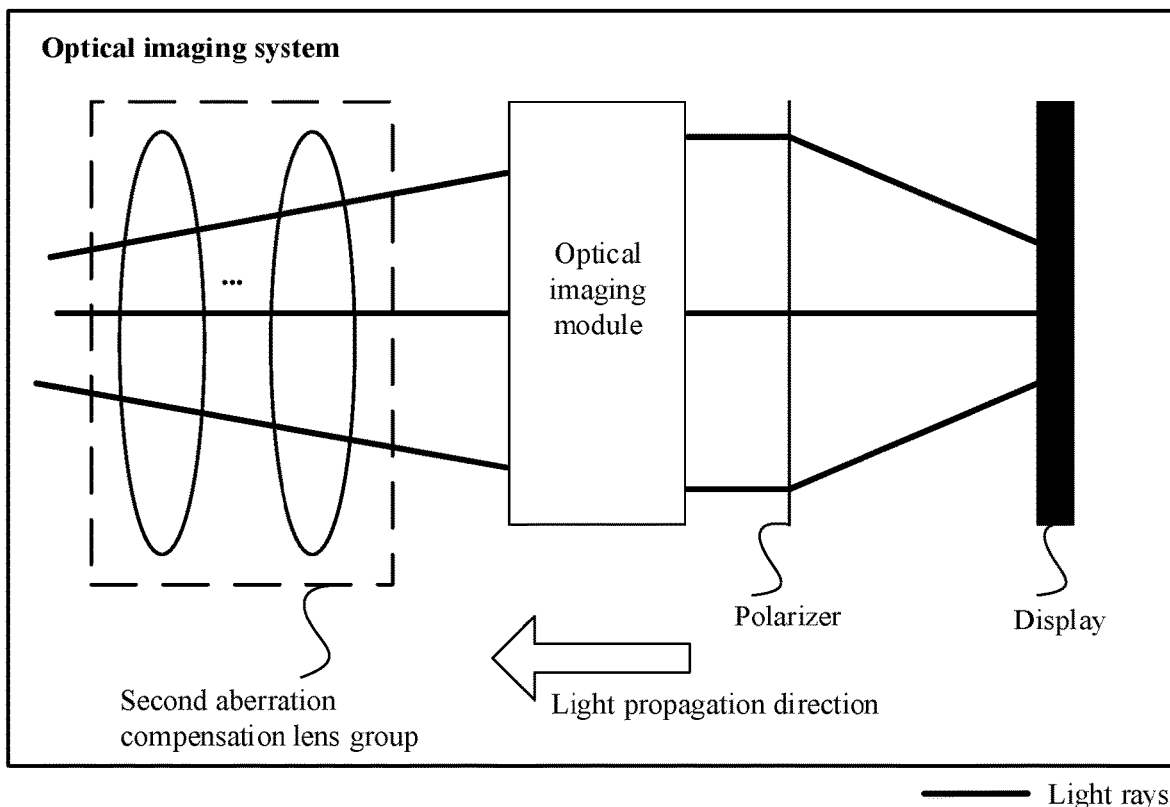
FIG. 13 is a ninth example structural diagram of an optical imaging system according to an embodiment of this application.

FIG. 13 is a ninth example structural diagram of an optical imaging system according to an embodiment of this application. The optical imaging system includes a second aberration compensation lens group, a polarizer, an optical imaging module, and a display. The display, the polarizer, the optical imaging module, and the second aberration compensation lens group are sequentially arranged. It may be understood that the polarizer is located between the optical imaging module and the display, and the second aberration compensation lens group is located after the optical imaging module in the display, the polarizer, and the optical imaging module that are sequentially arranged. A difference from the case in which the first aberration compensation lens group is located between the display and the polarizer lies in that no aberration compensation needs to be performed on non-polarized light emitted by the display, and aberration compensation is performed on polarized light emitted by the optical imaging module. For example, the display is configured to emit non-polarized light. The polarizer is configured to transmit polarized light in the non-polarized light emitted by the display. The optical imaging module is configured to: fold an optical path, and emit the polarized light. The second aberration compensation lens group is configured to perform aberration compensation on the polarized light emitted by the optical imaging module. For detailed explanations of the second aberration compensation lens group, the polarizer, and the optical imaging module, refer to the detailed descriptions in the foregoing embodiments. Details are not described in this embodiment of this application again.

In addition, no substrate needs to be disposed for a second quarter-wave plate and a reflective polarizer, and the second quarter-wave plate and the reflective polarizer may be stuck to an aberration compensation lens that is closest to the reflective polarizer in the second aberration compensation lens group. For other specific implementations of a material, surfaces, and quantities of aberration compensation lenses in the second aberration compensation lens groups, the polarizer, and the optical imaging module, refer to the detailed descriptions in the foregoing embodiments. Details are not described in this embodiment of this application again.

According to the optical imaging system provided in this embodiment, an aberration compensation function and an imaging function of the optical imaging system are separated. The second aberration compensation lens group implementing the aberration compensation function is disposed after the optical imaging module in the display, the polarizer, and the optical imaging module that are sequentially arranged. In this case, because an aberration compensation lens is not limited by a birefringent characteristic of a material, any optical resin material may be selected, so that optical resin materials having different refractive indexes are appropriately selected, to achieve relatively high imaging definition. In addition, because the optical resin material has relatively low density, a weight of the optical imaging system is effectively reduced. In addition, an imaging lens that implements main light refraction is located between the reflective polarizer and the polarizer, to reduce a size by using a polarized and folded optical path. Therefore, objectives of reducing the size and the weight and obtaining relatively high imaging definition under a relatively large FoV (for example, FoV>70°) are achieved.

Figure 14:
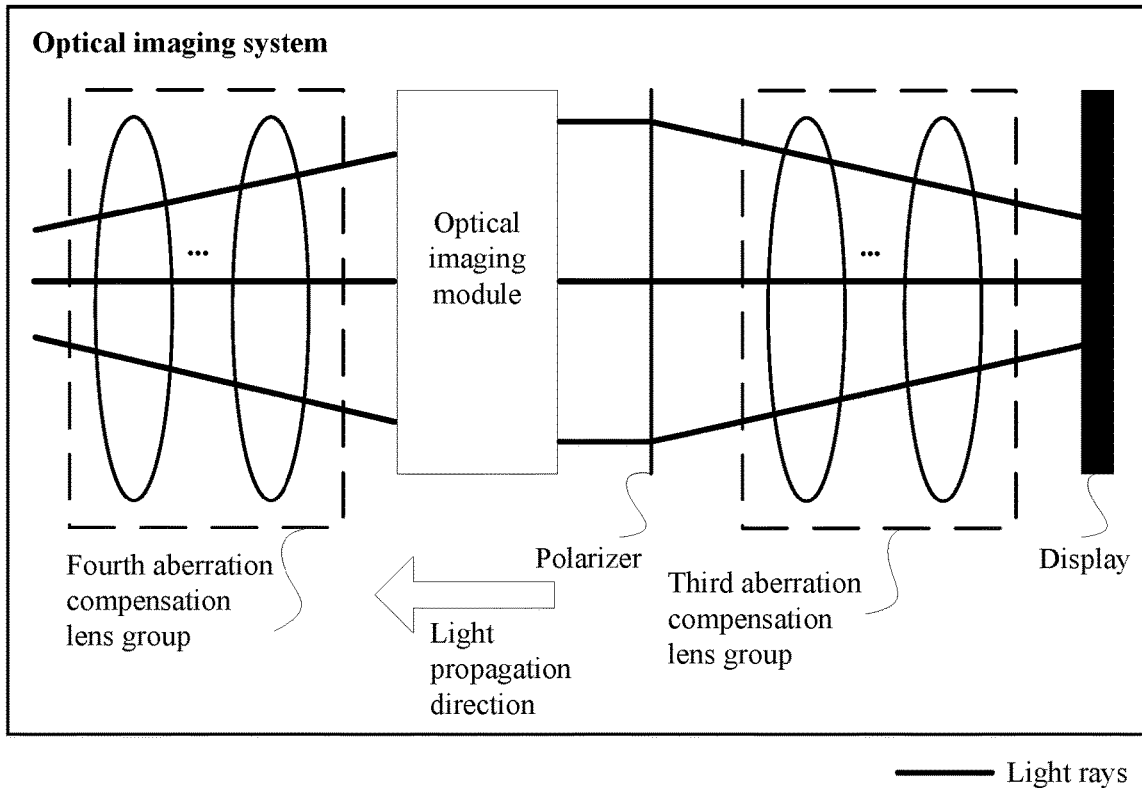
FIG. 14 is a tenth example structural diagram of an optical imaging system according to an embodiment of this application.

FIG. 14 is a tenth example structural diagram of an optical imaging system according to an embodiment in accordance with the present disclosure. The optical imaging system includes a third aberration compensation lens group, a fourth aberration compensation lens group, a polarizer, an optical imaging module, and a display. The display, the third aberration compensation lens group, the polarizer, the optical imaging module, and the fourth aberration compensation lens group are sequentially arranged.

In an imaging process, aberration compensation is performed on both non-polarized light emitted by the display and polarized light emitted by the optical imaging module.

Specifically, the display is configured to emit non-polarized light. The third aberration compensation lens group is configured to perform aberration compensation on the non-polarized light emitted by the display. The polarizer is configured to transmit polarized light in non-polarized light that is obtained after the aberration compensation and that is emitted by the third aberration compensation lens group. The optical imaging module is configured to: fold an optical path, and emit the polarized light. The fourth aberration compensation lens group is configured to perform aberration compensation on the polarized light emitted by the optical imaging module.

Materials of aberration compensation lenses included in the third aberration compensation lens group and the fourth aberration compensation lens group may be the same or may be different. For example, a material of the aberration compensation lens included in the third aberration compensation lens group and a material of the aberration compensation lens included in the fourth aberration compensation lens group may be optical resin. Surfaces, surface shapes, and quantities of the aberration compensation lenses included in the third aberration compensation lens group and the fourth aberration compensation lens group may be adjusted based on magnitude of aberration needing to be compensated for. For an example implementation, refer to the detailed descriptions in the foregoing embodiments. Details are not described in this embodiment of this application again. In addition, for specific implementations of the polarizer and the optical imaging module, refer to the detailed descriptions in the foregoing embodiments. Details are not described in this embodiment of this application again.

It should be noted that if the third aberration compensation lens group includes at least two aberration compensation lenses, or an imaging lens group includes at least two imaging lenses, the fourth aberration compensation lens group may be cancelled, or the aberration compensation lens included in the fourth aberration compensation lens group may be set to an optical resin sheet, and used as a substrate of a reflective polarizer. In addition, the polarizer and a first quarter-wave plate may not be stuck to the aberration compensation lens included in the third aberration compensation lens group, or may be independently stuck to a plane or curved substrate, to increase a degree of freedom of designing the third aberration compensation lens group, thereby helping to improve imaging definition.

According to the optical imaging system provided in this embodiment, an aberration compensation function and an imaging function of the optical imaging system are separated. An aberration compensation lens group implementing the aberration compensation function is located between the display and the polarizer, and is located after the optical imaging module in the display, the polarizer, and the optical imaging module that are sequentially arranged. In this case, because an aberration compensation lens is not limited by a birefringent characteristic of a material, any optical resin material may be selected, so that optical resin materials having different refractive indexes are appropriately selected, to achieve relatively high imaging definition. In addition, because the optical resin material has relatively low density, a weight of the optical imaging system is effectively reduced. In addition, an imaging lens that implements main light refraction is located between the reflective polarizer and the polarizer, to reduce a size by using a polarized and folded optical path. Therefore, objectives of reducing the size and the weight and obtaining relatively high imaging definition under a relatively large FoV (for example, FoV>70°) are achieved.

In implementations of the foregoing embodiments, anti-reflection processing needs to be performed on contact surfaces of any two different materials (glass, optical resin, air, and film layer materials), for example, antireflective films are coated.

The optical imaging system in the foregoing embodiments may be applied to a head-mounted display device, for example, a VR device. The VR device may be a VR helmet, VR glasses, or movie glasses. The movie glasses may be a VR device whose virtual display is a rectangular. Certainly, the movie glasses may alternatively be a VR device whose virtual display is a round or a circular arc with a trim.

Figure 15:
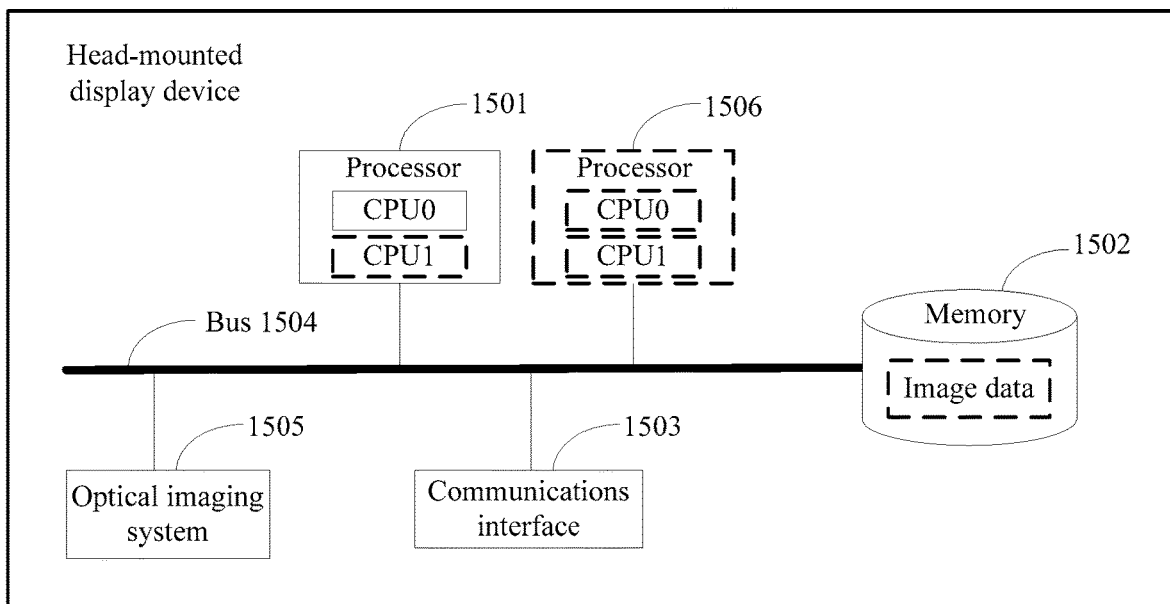
FIG. 15 is a first example structural diagram of a head-mounted display device according to an embodiment of this application.

FIG. 15 is a first example structural diagram of a head-mounted display device according to an embodiment of this application. As shown in FIG. 15, the head-mounted display device may include at least one processor 1501, a memory 1502, a communications interface 1503, a communications bus 1504, and an optical imaging system 1505.

The following specifically describes, with reference to FIG. 15, the components of the head-mounted display device.

The processor 1501 is a control center of the head-mounted display device, and may be a processor, or may be a collective name of a plurality of processing elements. During specific implementation, in an embodiment, the processor 1501 may include one central processing unit (CPU) or a plurality of CPUs, for example, a CPU 0 and a CPU 1 in FIG. 15. The processor 1501 may alternatively be an application-specific integrated circuit (ASIC), or one or more integrated circuits configured to implement the embodiments of this application, for example, one or more digital signal processor (DSP), or one or more field programmable gate arrays (FPGA).

That the processor 1501 is one or more CPUs is used as an example. The processor 1501 may run or execute image data stored in the memory 1502 of the head-mounted display device, to enable a display included in the optical imaging system 1505 to display an image, so that the optical imaging system 1505 presents a virtual image of the image displayed by the display.

During specific implementation, in an embodiment, the head-mounted display device may include a plurality of processors, for example, a processor 1501 and a processor 1506 in FIG. 15. Each of the processors may be a single-core (single-CPU) processor, or may be a multi-core (multi-CPU) processor. The processors may be one or more devices, circuits, and/or processing cores configured to process data (for example, a computer program instruction).

The memory 1502 may be a read-only memory (ROM) or another type of static storage device capable of storing static information and an instruction, a random access memory (RAM) or another type of dynamic storage device capable of storing information and an instruction, or may be an electrically erasable programmable read-only memory (EE- PROM), a magnetic disk storage medium or another magnetic storage device, or any other medium capable of carrying or storing expected program code in a form of an instruction or a data structure and capable of being accessed by a computer, but is not limited thereto. The memory 1502 may exist independently, or may be connected to the processor 1501 by using the communications bus 1504. The memory 1502 may alternatively be integrated with the processor 1501.

The memory 1502 is configured to store image data, and the processor 1501 controls execution of the image data.

The optical imaging system 1505 may be connected to the memory 1502 and the processor 1501 by using the bus, so that the image content stored in the memory 1502 is displayed.

The communications interface 1503 is configured to communicate with another device or communications network, and the communications interface 1503 may include a receiving unit to implement a receiving function, and a sending unit to implement a sending function.

The communications bus 1504 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

The device structure shown in FIG. 15 does not constitute any limitation to the head-mounted display device, and the device may include more or fewer components than those in the figure, or some components may be combined, or a different component arrangement may be used.

Figure 16:
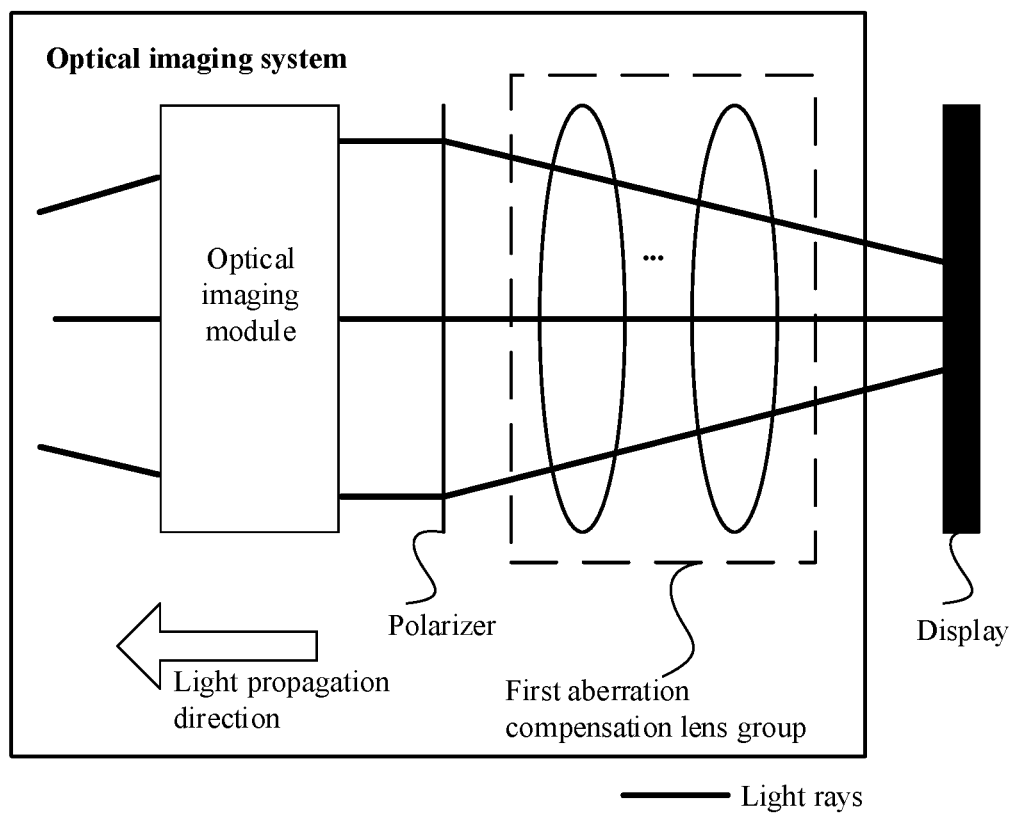
FIG. 16 is an eleventh example structural diagram of an optical imaging system according to an embodiment of this application.

In some embodiments, the optical imaging system in the embodiments may not include the display, and the display is included in the head-mounted display device. For example, FIG. 16 is an eleventh example structural diagram of an optical imaging system according to an embodiment of this application. The optical imaging system includes a first aberration compensation lens group, a polarizer, and an optical imaging module. The first aberration compensation lens group, the polarizer, and the optical imaging module are sequentially arranged.

Figure 17:
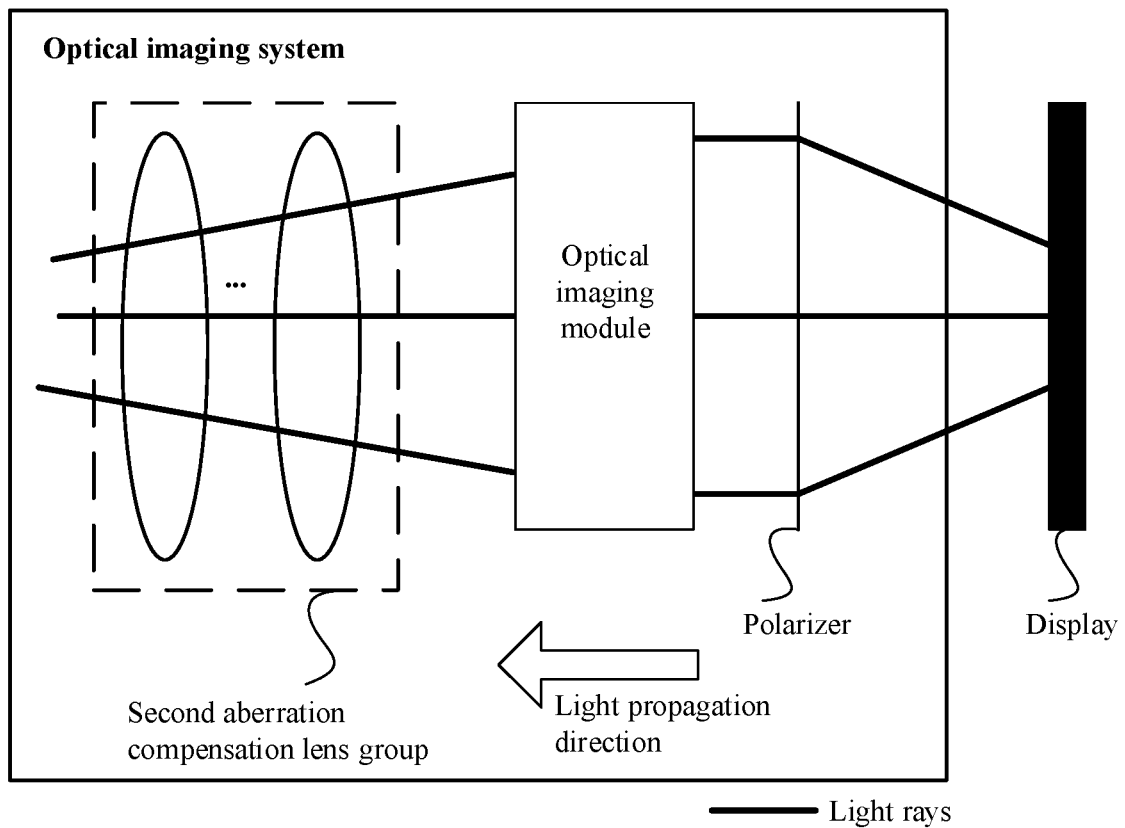
FIG. 17 is a twelfth example structural diagram of an optical imaging system according to an embodiment of this application.

FIG. 17 is a twelfth example structural diagram of an optical imaging system according to an embodiment of this application. The optical imaging system includes a second aberration compensation lens group, a polarizer, and an optical imaging module. The polarizer, the optical imaging module, and the second aberration compensation lens group are sequentially arranged.

Figure 18:
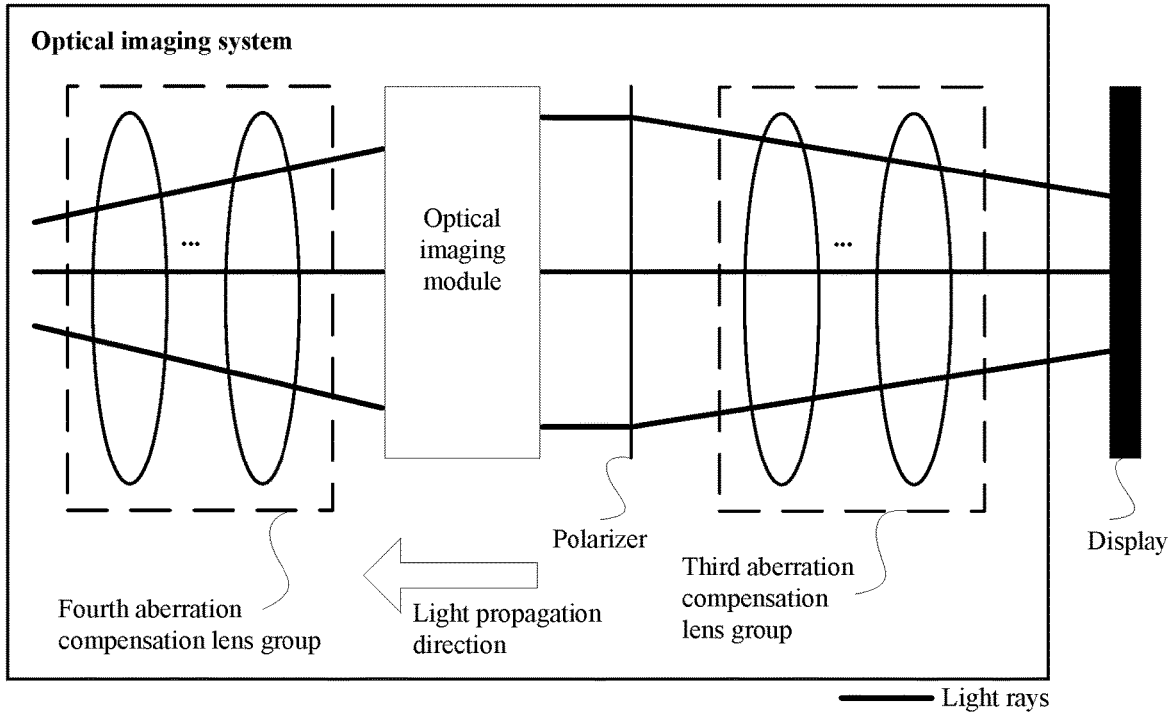
FIG. 18 is a thirteenth example structural diagram of an optical imaging system according to an embodiment of this application.

FIG. 18 is a thirteenth example structural diagram of an optical imaging system according to an embodiment of this application. The optical imaging system includes a third aberration compensation lens group, a fourth aberration compensation lens group, a polarizer, and an optical imaging module. The third aberration compensation lens group, the polarizer, the optical imaging module, and the fourth aberration compensation lens group are sequentially arranged.

For example implementations of the aberration compensation lens group, the polarizer, and the optical imaging module, refer to the detailed descriptions in the foregoing embodiments. Details are not described in this embodiment of this application again.

Figure 19:
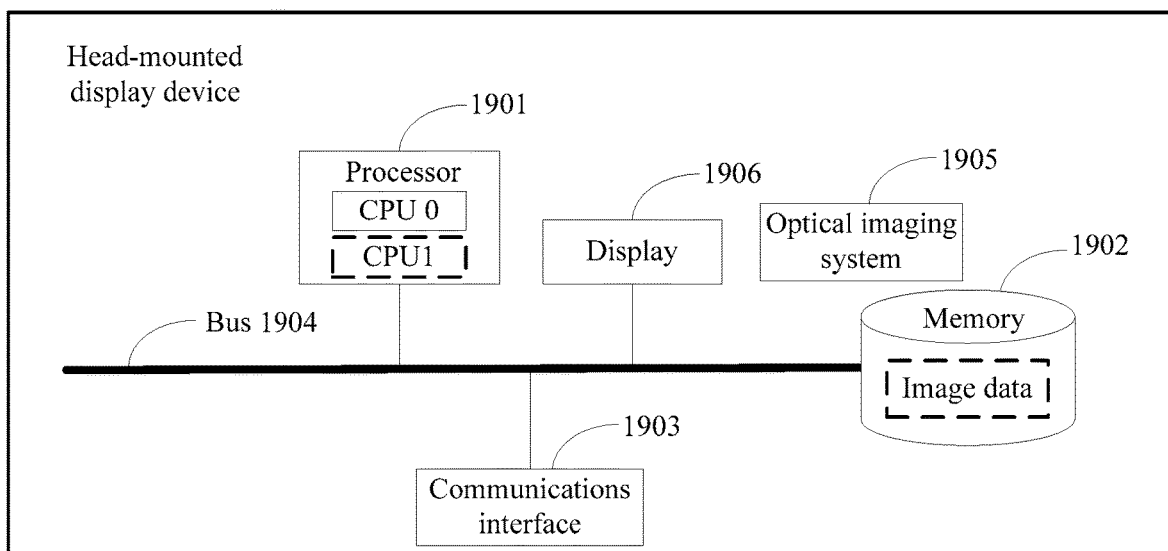
FIG. 19 is a second example structural diagram of a head-mounted display device according to an embodiment of this application.

FIG. 19 is a second example structural diagram of a head-mounted display device according to an embodiment of this application. As shown in FIG. 19, the head-mounted display device may include at least one processor 1901, a memory 1902, a communications interface 1903, a communications bus 1904, an optical imaging system 1905, and a display 1906. For example explanations, refer to the descriptions of the head-mounted display device in FIG. 15. Details are not described in this embodiment again.

In addition, implementations described in various embodiments may be combined based on requirements of specific application scenarios (products), to achieve objectives of reducing the size and the weight and obtaining relatively high imaging definition. Although the embodiments of this application are provided for the optical imaging system of the VR device, and the embodiments are coaxial optical systems, the principle may be extended to an augmented reality (augmented reality, AR) optical imaging system, and an optical path deflection component may be added to enable the optical imaging system to become an off-axis optical system.

What is claimed is:

1. An optical imaging system, comprising:
   a first aberration compensation lens group, a polarizer, an optical imaging module, and a display, wherein the display, the first aberration compensation lens group, the polarizer, and the optical imaging module are sequentially arranged, wherein
   the first aberration compensation lens group is between the display and the polarizer,
   the polarizer is between the first aberration compensation lens group and the optical imaging module,
   the display is configured to emit non-polarized light,
   the first aberration compensation lens group is configured to perform aberration compensation on the non-polarized light emitted by the display,
   the polarizer is configured to transmit polarized light from the non-polarized light emitted by the first aberration compensation lens group after the aberration compensation,
   the optical imaging module is configured to fold an optical path, and emit the polarized light,
   the optical imaging module comprises a first quarter-wave plate, a partial-transmission partial-reflection film, a second quarter-wave plate, and a reflective polarizer, wherein the first quarter-wave plate, the partial-transmission partial-reflection film, the second quarter-wave plate, and the reflective polarizer are sequentially arranged,
   the first quarter-wave plate is configured to convert first polarized light emitted by the polarizer into first circularly polarized light,
   the partial-transmission partial-reflection film is configured to:
   transmit a part of the first circularly polarized light emitted by the first quarter-wave plate, and
   reflect a part of second circularly polarized light emitted by the second quarter-wave plate;
   the second quarter-wave plate is configured to:
   convert the part of the first circularly polarized light emitted by the partial-transmission partial-reflection film into second polarized light,
   convert the second polarized light reflected by the reflective polarizer into the second circularly polarized light, and
   convert the part of the second circularly polarized light emitted by the partial-transmission partial-reflection film into a first polarized light, and
   the reflective polarizer is configured to:
   reflect the second polarized light emitted by the second quarter-wave plate, and transmit the first polarized light emitted by the second quarter-wave plate.

2. The optical imaging system according to claim 1, wherein a material of the first aberration compensation lens group comprises optical resin.

3. The optical imaging system according to claim 1, wherein
the first aberration compensation lens group comprises at least one aberration compensation lens, and
surfaces of the at least one aberration compensation lens comprise a refraction surface.

4. The optical imaging system according to claim 1, further comprising:
a second aberration compensation lens group, wherein
the optical imaging module is between the polarizer and the second aberration compensation lens group, and
the second aberration compensation lens group is configured to perform aberration compensation on the polarized light emitted by the optical imaging module.

5. The optical imaging system according to claim 1, wherein
the first aberration compensation lens group comprises an aberration compensation lens, and
both surfaces of the aberration compensation lens are curved, refraction surfaces.

6. The optical imaging system according to claim 1, wherein
the optical imaging module further comprises an imaging lens group,
the imaging lens group is located between the polarizer and the reflective polarizer, and
the imaging lens group is configured to transmit the first polarized light, the first circularly polarized light, the second polarized light, or the second circularly polarized light.

7. The optical imaging system according to claim 6, wherein
the polarizer, the first quarter-wave plate, and an imaging lens in the imaging lens group are sequentially glued together, and
the imaging lens is an imaging lens that is closest to the display in the imaging lens group.

8. The optical imaging system according to claim 6, wherein
an imaging lens, the first quarter-wave plate, the polarizer, and an aberration compensation lens are sequentially glued together,
the imaging lens is an imaging lens that is closest to the display in the imaging lens group,
the aberration compensation lens is an aberration compensation lens that is farthest from the display in the first aberration compensation lens group.

9. The optical imaging system according to claim 6, wherein
the partial-transmission partial-reflection film is located on a curved surface of an imaging lens in the imaging lens group,
in the imaging lens group, the curved surface is other than a surface that is farthest from the display, and
the curved surface is convex towards the display.

10. The optical imaging system according to claim 6, wherein
the polarizer and the first quarter-wave plate are sequentially stuck to a plane surface that is farther from the display of two surfaces of an aberration compensation lens, and
the aberration compensation lens is an aberration compensation lens that is farthest from the display in the first aberration compensation lens group.

11. A head-mounted display device, comprising:
an optical imaging system, a processor, a memory, a bus, and a communications interface, wherein
the optical imaging system comprises a first aberration compensation lens group, a polarizer, an optical imaging module, and a display,
the display, the first aberration compensation lens group, the polarizer, and the optical imaging module are sequentially arranged,
the first aberration compensation lens group is between the display and the polarizer,
the polarizer is between the first aberration compensation lens group and the optical imaging module,
the display is configured to emit non-polarized light,
the first aberration compensation lens group is configured to perform aberration compensation on the non-polarized light emitted by the display,
the polarizer is configured to transmit polarized light from the non-polarized light emitted by the first aberration compensation lens group after the aberration compensation,
the optical imaging module is configured to fold an optical path, and emit the polarized light,
the memory is configured to store image data to be executed by the processor to enable the display to display an image and emit the non-polarized light,
the optical imaging module comprises a first quarter-wave plate, a partial-transmission partial-reflection film, a second quarter-wave plate, and a reflective polarizer, wherein the first quarter-wave plate, the partial-transmission partial-reflection film, the second quarter-wave plate, and the reflective polarizer are sequentially arranged,
the first quarter-wave plate is configured to convert first polarized light emitted by the polarizer into first circularly polarized light,
the partial-transmission partial-reflection film is configured to:
transmit a part of the first circularly polarized light emitted by the first quarter-wave plate, and
reflect a part of second circularly polarized light emitted by the second quarter-wave plate;
the second quarter-wave plate is configured to:
convert the part of the first circularly polarized light emitted by the partial-transmission partial-reflection film into second polarized light,
convert the second polarized light reflected by the reflective polarizer into the second circularly polarized light, and
convert the part of the second circularly polarized light emitted by the partial-transmission partial-reflection film into a first polarized light, and
the reflective polarizer is configured to:
reflect the second polarized light emitted by the second quarter-wave plate, and
transmit the first polarized light emitted by the second quarter-wave plate.

12. An optical imaging system, comprising:
a second aberration compensation lens group, a polarizer, and an optical imaging module, wherein the polarizer, the optical imaging module, and the second aberration compensation lens group are sequentially arranged, wherein the optical imaging module is between the polarizer and the second aberration compensation lens group, the polarizer is configured to transmit polarized light from non-polarized light emitted by a display, the optical imaging module is configured to fold an optical path, and emit the polarized light, the second aberration compensation lens group is configured to perform aberration compensation on the polarized light emitted by the optical imaging module, the optical imaging module comprises a first quarter-wave plate, a partial-transmission partial-reflection film, a second quarter-wave plate, and a reflective polarizer, wherein the first quarter-wave plate, the partial-transmission partial-reflection film, the second quarter-wave plate, and the reflective polarizer are sequentially arranged, the optical imaging module further comprises an imaging lens group located between the polarizer and the reflective polarizer, the imaging lens group comprises first and second imaging lenses, and the partial-transmission partial-reflection film is between the first and second imaging lenses.

13. The optical imaging system according to claim 12, wherein
a material of the second aberration compensation lens group comprises optical resin.

14. The optical imaging system according to claim 12, wherein
the second aberration compensation lens group comprises at least one aberration compensation lens, and
surfaces of the at least one aberration compensation lens comprise a refraction surface.

15. A head-mounted display device, comprising:
the optical imaging system according to claim 12, the display, a processor, a memory, a bus, and a communications interface,
wherein the memory is configured to store image data to be executed by the processor to enable the display to display an image and emit the non-polarized light.

16. The optical imaging system according to claim 12, wherein
the first quarter-wave plate is configured to convert first polarized light emitted by the polarizer into first circularly polarized light,
the partial-transmission partial-reflection film is configured to:
transmit a part of the first circularly polarized light emitted by the first quarter-wave plate, and
reflect a part of second circularly polarized light emitted by the second quarter-wave plate,
the second quarter-wave plate is configured to:
convert the part of the first circularly polarized light emitted by the partial-transmission partial-reflection film into second polarized light,
convert the second polarized light reflected by the reflective polarizer into the second circularly polarized light, and
convert the part of the second circularly polarized light emitted by the partial-transmission partial-reflection film into a first polarized light, and
the reflective polarizer is configured to: reflect the second polarized light emitted by the second quarter-wave plate, and transmit the first polarized light emitted by the second quarter-wave plate.

17. The optical imaging system according to claim 16, wherein
the imaging lens group is configured to transmit the first polarized light, the first circularly polarized light, the second polarized light, or the second circularly polarized light.

18. The optical imaging system according to claim 12, wherein
the polarizer, the first quarter-wave plate, and an imaging lens are sequentially glued together, and
the imaging lens is an imaging lens that is closest to the first quarter-wave plate in the imaging lens group.

19. The optical imaging system according to claim 18, wherein
the imaging lens that is closest to the first quarter-wave plate in the imaging lens group is the first imaging lens, and
the partial-transmission partial-reflection film is stuck to a curved surface that is of the second imaging lens and that is convex towards the polarizer.

* * * * *